US011989439B2

United States Patent
Izzi et al.

(10) Patent No.: US 11,989,439 B2
(45) Date of Patent: May 21, 2024

(54) DETERMINING AVAILABLE RESOURCES FOR STORING DATA

(71) Applicant: Micron Technology, Inc., Boise, ID (US)

(72) Inventors: Roberto Izzi, Caserta (IT); Reshmi Basu, Boise, ID (US); Luca Porzio, Casalnuovo (IT); Christian M. Gyllenskog, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 150 days.

(21) Appl. No.: 17/488,205

(22) Filed: Sep. 28, 2021

(65) Prior Publication Data

US 2023/0063502 A1 Mar. 2, 2023

Related U.S. Application Data

(60) Provisional application No. 63/238,027, filed on Aug. 27, 2021.

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/0253* (2013.01); *G06F 2212/7205* (2013.01)

(58) Field of Classification Search
CPC ......... G06F 12/0253; G06F 2212/7205; G06F 3/0604; G06F 3/0655; G06F 3/0679

USPC ......................................................... 711/154
See application file for complete search history.

(56) References Cited

U.S. PATENT DOCUMENTS

| | | | | |
|---|---|---|---|---|
| 2015/0006963 | A1* | 1/2015 | Geisert | G06F 11/0781 714/38.11 |
| 2016/0313943 | A1* | 10/2016 | Hashimoto | G06F 3/0659 |
| 2018/0039441 | A1* | 2/2018 | Nimura | G06F 3/0656 |
| 2019/0179629 | A1* | 6/2019 | Roy | H03M 7/30 |
| 2020/0042250 | A1* | 2/2020 | Oh | G06F 3/0611 |
| 2020/0104195 | A1* | 4/2020 | Sanghi | G06F 15/17325 |
| 2020/0401341 | A1* | 12/2020 | Muthiah | G06F 3/0658 |
| 2021/0278990 | A1* | 9/2021 | Choi | G06F 3/0608 |

* cited by examiner

*Primary Examiner* — Hashem Farrokh
(74) *Attorney, Agent, or Firm* — Holland & Hart LLP

(57) ABSTRACT

Methods, systems, and devices for memory operations are described. A host system may obtain data for writing to a memory system. The host system may send, to the memory system, an indication that the data is to be written to the memory system, and the memory system may remove invalid data at the memory system until the memory system has sufficient resources to store the data. Based on the memory system having sufficient resources, the memory system may delay background operations at the memory system until the data has been written to the memory system. The memory system may also create a restore point based on the memory system having sufficient resources and receiving the data. In other examples, the removal of invalid data at the memory system may be delayed until after the data is written to the memory system.

30 Claims, 11 Drawing Sheets

DETERMINING AVAILABLE RESOURCES FOR STORING DATA

CROSS-REFERENCE

The present Application for Patent claims the benefit of U.S. Provisional Patent Application No. 63/238,027 by IZZI et al., entitled "Determining Available Resources for Storing Data," filed Aug. 27, 2021, assigned to the assignee hereof, and expressly incorporated by reference herein.

FIELD OF TECHNOLOGY

The following relates generally to one or more systems for memory and more specifically to determining available resources for storing data.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
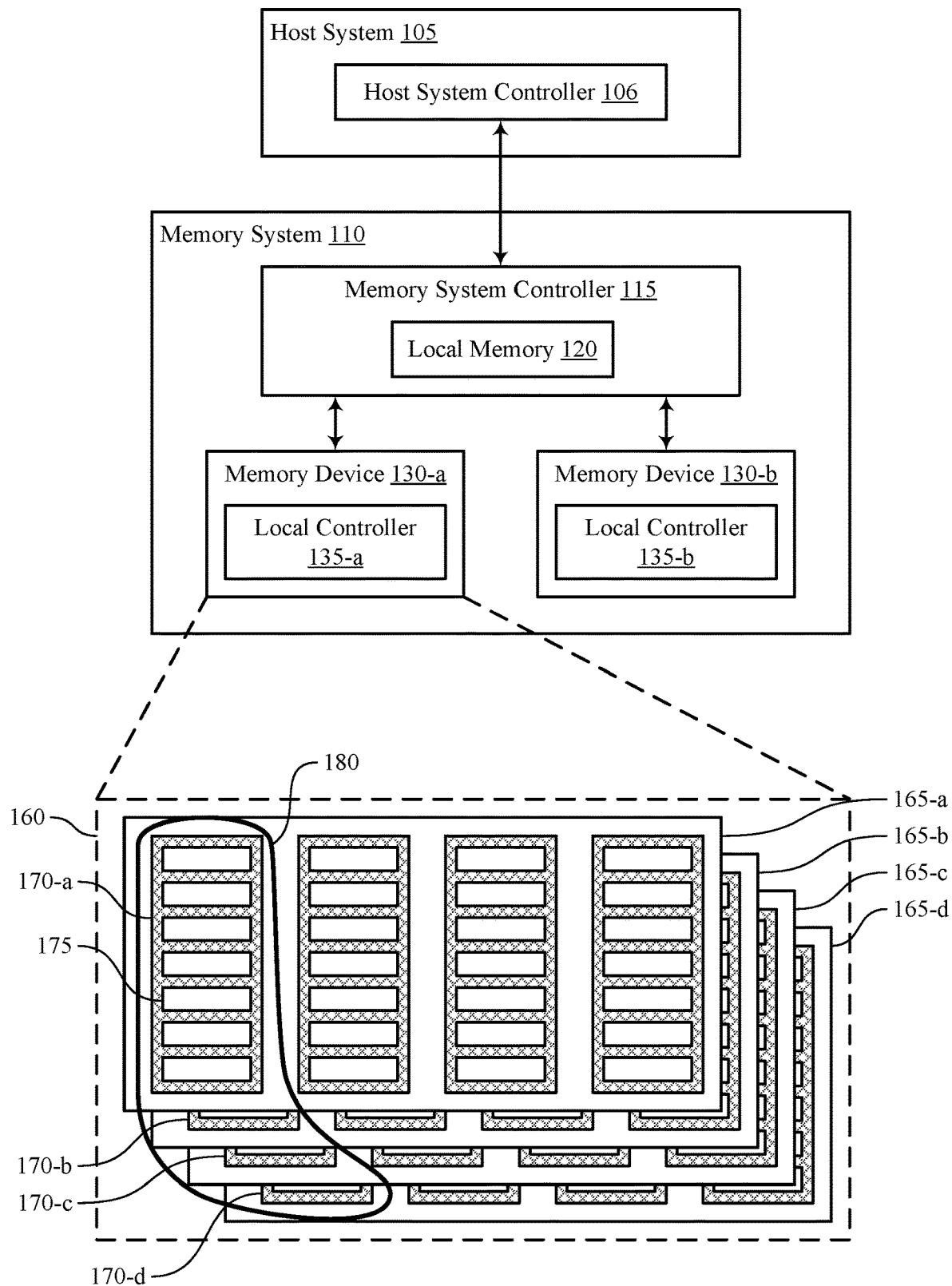
FIG. 1 illustrates an example of a system that supports determining available resources for storing data in accordance with examples as disclosed herein.

A memory system may be used to store information for a program that on a device (e.g., an operating system, an application). In some examples, data for the program may be received at a host system from an external source—e.g., using over-the-air software updates. A size of the received data may be relatively large—e.g., multiple gigabytes. In some examples, the received data may include multiple or batched updates. Based on or in response to receiving the data, the host system may attempt to store the data at memory system. To store the data at memory system, host system may issue a series of write commands to write the data at the memory system. If the received data includes multiple updates, the host system may receive and write the multiple updates to the memory system successively.

In some examples, however, a memory system may have insufficient space to store data for the program that is received at the host system. In such cases, the operation(s) for writing the data at the memory system may fail. Additionally, or alternatively, while the data is being written to the memory system, background operations running at the memory system may cause data stored at the memory system and associated with the program to be moved, unexpectedly from where it was previously located or even to the host system. In such cases, the operation for writing the data at the memory system may succeed, but the data for the program may be corrupted while or after the data is written. In the event of such a failure, the host system may be unable to roll back (e.g., revert) the memory system to a state that preceded writing the data, and, in some examples, a device including the memory system and the host system may be rendered inoperable as a result of the failure to properly write the data to the memory system.

To increase the likelihood that an operation for writing a set of data to a memory system (which may be referred to as a programming operation) will be completed successfully, new techniques for allocating (e.g., creating, reserving) sufficient space for writing the set of data may be used. Also, to prevent a failed programming operation from rendering a device inoperable, new techniques that enable a program to be rolled back to a version that preceded the programming operation may be used.

In some examples, a host system may obtain data for writing to a memory system. The host system may send, to the memory system, an indication that the data is to be written to the memory system, and the memory system may remove invalid data at the memory system until the memory system has sufficient resources to store the data. Based on or in response to the memory system having sufficient resources, the memory system may delay background operations (e.g., garbage collection) at the memory system until the data has been written to the memory system. The memory system may also create a restore point based on or in response to the memory system having sufficient resources and receiving the data.

In some examples, a host system may obtain data for writing to a memory system. The host system may begin writing the data to a set of resources at the memory system, where the memory system may prohibit background operations (e.g., garbage collection) from being performed for the set of resources. Before writing the data to the set of resources, the host system may request an indication of whether the memory system includes available resources for storing the data. The memory system may transmit the indication of whether the memory system includes available resources based on or in response to comparing a size of the set of resources with a threshold. If the size of the set of resources is less than the threshold, the memory system may indicate that resources are available for the data. Based on or in response to determining whether there are available resources, the memory system may begin writing the data to the memory system if there are available resources. The memory system may also create a restore point based on or in response to beginning to write the data.

Features of the disclosure are initially described in the context of memory systems. Features of the disclosure are also described in the context of process flows and flowcharts. These and other features of the disclosure are further illustrated by and described in the context of apparatus diagrams and flowcharts that relate to determining available resources for storing data.

FIG. 1 illustrates an example of a system 100 that supports determining available resources for storing data in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160, which may be memory dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to single-level memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support determining available resources for storing data. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

A memory system 110 may be used to store instructions for a program that is installed on a device (e.g., an operating system, an application). In some examples, data for the program may be received at a host system 105 from an external source—e.g., using over-the-air software updates. A size of the received data may be relatively large—e.g., multiple gigabytes. In some examples, the received data may include multiple updates. Based on or in response to receiving the data, the host system 105 may attempt to store the data at the memory system 110. To store the data at the memory system 110, the host system 105 may issue a series of write commands to write the data at the memory system 110. If the received data includes multiple updates, the host system 105 may receive and write the multiple updates to the memory system 110 successively.

In some examples, the memory system 110 may have insufficient space to store data for a program that is received at the host system 105. In such cases, the operation for writing the data at the memory system 110 may fail. Additionally, or alternatively, while the data is being written to the memory system 110, background operations running at the memory system 110 may cause data stored at the memory system 110 and associated with the program to be moved, unexpectedly, to a different location, such as to the host system 105. In such cases, the operation for writing the data at the memory system 110 may succeed, but the data for the program may be corrupted while or after the data is written. In the event of a writing failure, a host system 105 may be unable to roll back the memory system 110 to a state that preceded writing the data, and, in some examples, a device including the memory system 110 and the host system 105 may be rendered inoperable as a result of the failure to properly write the data to the memory system 110.

To increase the likelihood that an operation for writing a set of data to a memory system (which may be referred to as a programming operation) will be completed successfully, techniques for allocating (e.g., creating, reserving) sufficient space for the writing the set of data may be used. Also, to prevent a failed programming operation from rendering a device inoperable, techniques that enable a program to be rolled back to a version that preceded the programming operation may be used.

In some examples, to increase the success of programming operations, garbage collection operations may be performed in advance of the programming operation to ensure sufficient space is available for the data of the programming operation. In some examples, a host system 105 may receive an update for software installed on a device that includes the host system 105. For example, the host system 105 may receive the update for an operating system installed on the host system 105—e.g., based on or in response to a user enabling the update to be performed. The update may be received at the host system 105 from an external server (e.g., over-the-air), and the host system 105 may write the update to the memory system 110. In some examples, the host system 105 may also receive an indication of the size of the update or determine an upper limit for the size of the update. Based on or in response to receiving the update, the host system 105 may transmit, to the memory system 110, an indication that the update is to be written to the memory system 110. Based on or in response to receiving the indication, the memory system 110 may remove invalid data at the memory system 110 (e.g., by performing a garbage collection operation to delete invalid data) until a size of available resources at the memory system 110 is greater than or equal to a size of the update.

Based on or in response to freeing up sufficient space in the memory system 110, the memory system 110 may also delay (e.g., disable) background operations, such as garbage collection, at the memory system 110. The memory system 110 may indicate to the host system 105 that there is sufficient space for the update, and the host system 105 may begin writing the update to the memory system 110. In some examples, before writing the update, the host system 105 may send an indication that an operation for writing the update is beginning so that the memory system 110 may create a restore point, which may be used for a roll back operation in the event that writing the update fails.

By freeing up sufficient space in memory for an update before performing the update, failures that would otherwise result from updates that require additional space may be avoided. Also, by creating a restore point, a program may be rolled back to a pre-update version in the event that the update fails for any reason (e.g., insufficient space, data corruption, loss of connection)

In some examples, to increase the success of programming operations, garbage collection operations may be delayed (e.g., disabled) for a set of resources used to store the data of the programming operation. In some examples, a host system 105 may receive an update for software installed on a device that includes the host system 105, as similarly described above. Based on or in response to receiving the update, the host system 105 may send a request to a memory system 110 for an indication of a size of resources at the memory system 110 that are available for storing the update. Based on or in response to receiving the indication, the memory system 110 may compare a size of a set of resources for which garbage collection has been delayed with a threshold—e.g., a size of the threshold may be based on or in response to a size of available resources at the memory system 110. If the size of the set of resources is below a threshold, the memory system 110 may indicate, to the host system 105, that there is sufficient space in the memory system 110 for the update. Accordingly, the host system 105 may indicate a beginning of the update and begin writing the update to the memory system 110, and the memory system 110 may create a restore point, as described above.

By delaying garbage collection for a set of resources reserved for storing an update (e.g., reserving a set of resources for updates), data for an update may be written to memory as soon as the data for an update is received. Also, if the memory runs out of free space while the update is being written to the memory, the memory may be able to restore the program to a pre-update version.

Figure 2:
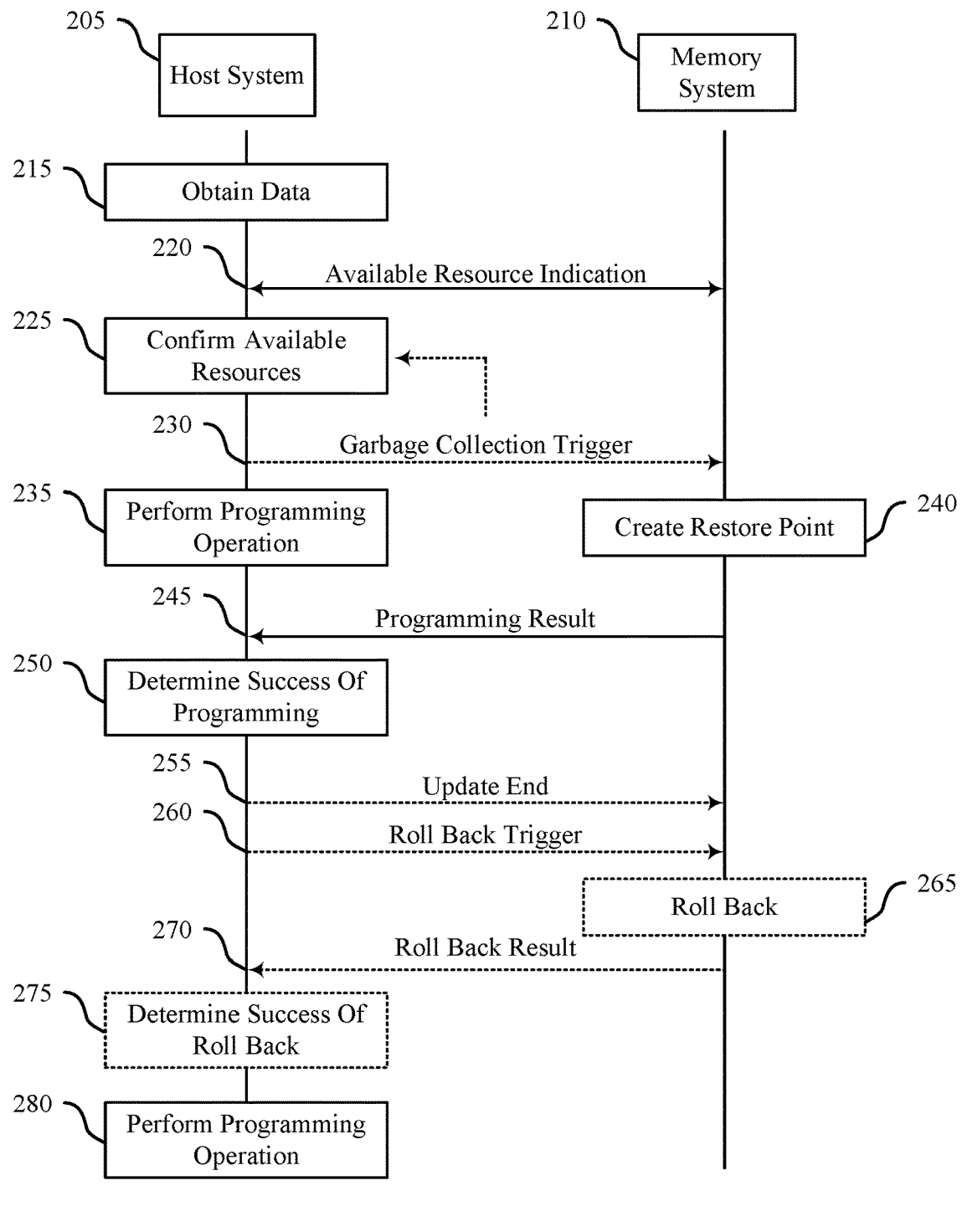
FIGS. 2 through 4 illustrate example sets of operations that support determining available resources for storing data in accordance with examples as disclosed herein.

FIG. 2 illustrates an example of a set of operations that supports determining available resources for storing data in accordance with examples as disclosed herein.

Process flow 200 may be performed by host system 205 and memory system 210, which may be examples of a host system or memory system described above with reference to FIG. 1. In some examples, process flow 200 illustrates an example set of operations performed to support determining available resources for storing data. For example, process flow 200 depicts operations for increasing a sufficient amount of available resources to enable an operation for writing a set of data to a memory system (which may be referred to as a programming operation) to be performed, while retaining a restore point in the event the programming operation fails.

One or more of the operations described in process flow 200 may be performed earlier or later in the process, omitted, replaced, supplemented, or combined with another operation. Also, additional operations described herein may be included in process flow 200.

Aspects of the process flow 200 may be implemented by a controller, among other components. Additionally or alternatively, aspects of the process flow 200 may be implemented as instructions stored in memory (e.g., firmware stored in a memory coupled with the host system 205 or firmware stored in a memory coupled with the memory system 210). For example, the instructions, when executed by a controller (e.g., at the host system 205), may cause the controller to perform the operations of the process flow 200.

At block 215, data may be obtained—e.g., the host system 205 may obtain data for writing to the memory system 210. In some examples, the host system 205 may receive an indication that data is to be written to the memory system 210. The data may be used to support an update for software (e.g., an application, operating system) installed at a device that includes the host system 205 and the memory system 210. The data may be received at the host system 205 from an external source—e.g., over-the-air. In some examples, the host system 205 may determine a size of the data—e.g., based on or in response to an indication received with the data. In other examples, the host system 205 may determine an upper limit for the size of the data—e.g., based on or in response to the type of data received, a programmed upper limit, etc.

At arrow 220, an indication of a size of available resources at memory system may be signaled—e.g., the host system 205 may transmit a request for a size of available resources at the memory system 210, and the memory system 210 may indicate to the host system the size of the available resources. In some examples, the host system 205 transmits a read descriptor for a size of free logical addresses.

At block 225, whether there are sufficient available resources at the memory system 210 may be confirmed—e.g., the host system 205 may confirm whether there are sufficient available resources at the memory system 210 to support the performance of the update. For example, the host system 205 may determine whether the size of the available resources at the memory system 210 is greater than the size of the update. In some examples, the host system 205 may determine whether the size of the available resources at the memory system 210 is greater than an upper limit for the size of the update.

At arrow 230, if it is determined that there are insufficient available resources, the host system 205 may transmit a message to the memory system 210 that triggers the performance of a garbage collection operation at the memory system 210. In some examples, the message may direct the memory system 210 to perform the garbage collection operation for a duration of time—e.g., five minutes. In other examples, the message may direct the memory system 210 to perform the garbage collection operation until the amount of available resources at the memory system 210 is sufficient to support the update. After completing the triggered garbage collection operation, the memory system 210 may indicate to the host system 205 a size of the available resources at the memory system 210.

In an example where the memory system 210 performs the garbage collection operation for a set duration of time (e.g., five minutes), the size of the available resources may be insufficient to support the update. In such cases, the host system 205 may send an additional message to the memory system 210 to trigger another garbage collection operation for the set duration of time based on or in response to determining the size of the available resources is less than the size of the update. This sequence of operations may continue until the available resources at the memory system 210 is sufficient to support the update.

In examples where the memory system 210 performs the garbage collection operation until the available resources at the memory system 210 is sufficient to support the update, the host system 205 may forego confirming whether the available resources at the memory system 210 are sufficient to support the update and proceed to a next operation. Though, in some examples, the host system 205 may still confirming whether the available resources at the memory system 210 are sufficient to support the update as an additional check.

At block 235, a programming operation for writing the data may be performed—e.g., the host system 205 may perform a programming operation for writing the data to the memory system 210. Performing the programming operation may include transmitting, to the memory system 210, a message including an indication that the programming operation has begun. Writing the data may include writing the data to desired locations within the memory system 210.

At block 240, a restore point may be created—e.g., the memory system 210 may create a restore point based on or in response to receiving the indication that the programming operation has begun. Creating a restore point may include storing L2P tables (e.g., physical page tables) and physical validity tables that are stored prior to the beginning of the programming operation.

At arrow 245, a result of the programming operation may be indicated—e.g., the memory system 210 may indicate a result of the programming operation to the host system 205. In some examples, the memory system 210 indicates that the programming operation failed. In other examples, the memory system 210 indicates that the programming operation succeeded.

At block 250, a result of the programming operation may be determined—e.g., host system 205 may determine the success or failure of the programming operation based on or in response to the indication received from the memory system 210. In some examples, the host system 205 determines that the programming operation was successful—e.g., that the data was written successfully to the proper locations in the memory system 210. In some examples, the host system 205 determines that the programming operation was unsuccessful—e.g., that the data was written unsuccessfully to the memory system 210.

At arrow 255, based on or in response to determining that the programming operation was successful, the host system 205 may transmit an indication of an end of the programming operation to the memory system 210.

At arrow 260, based on or in response to determining that the programming operation failed, the host system 205 may transmit a message directing the memory system 210 to roll back to a state that preceded the programming operation.

At block 265, a state preceding the programming operation may be restored at the memory system 210—e.g., the memory system 210 may restore itself to a state that preceded the programming operation. In some examples, restoring the prior state may include replacing the current L2P and validity tables with the corresponding tables that were stored prior to the beginning of the programming operation. Additionally, or alternatively, restoring the prior state may include unmapping the logical addresses written during the programming operation. Restoring the prior state may also include deleting the data stored at the physical addresses corresponding to the unmapped logical addresses. To determine the logical addresses that were changed (e.g., written or unmapped) during the programming operation, the memory system 210 may compare the current L2P and validity tables with the previously stored L2P and validity tables.

At arrow 270, a result of the roll back operation may be indicated—e.g., the memory system 210 may indicate a result of the roll back operation to the host system 205. In some examples, the memory system 210 may indicate that the roll back operation was successful—e.g., that the data stored in the memory system 210 matches the data stored in the memory system 210 prior to the programming operation. In some examples, the memory system 210 may indicate that the roll back operation was unsuccessful—e.g., that the data stored in the memory system 210 is different than the data stored in the memory system 210 prior to the programming operation.

At block 275, a success of the roll back operation may be determined—e.g., the host system 205 may determine a success of the roll back operation at the memory system 210—e.g., based on or in response to the received indication of the result of the roll back operation. In some examples, the host system 205 may determine that the roll back operation was successful—e.g., based on or in response to receiving an indication that the roll back operation was successful. In other examples, the host system 205 may determine that the roll back operation was unsuccessful—e.g., based on or in response to receiving an indication that the roll back operation was unsuccessful or not receiving any indication of the result of the roll back operation.

At block 280, if the host system 205 determines that the roll back operation was unsuccessful, the host system 205 may perform the programming operation for a second time.

Figure 3:
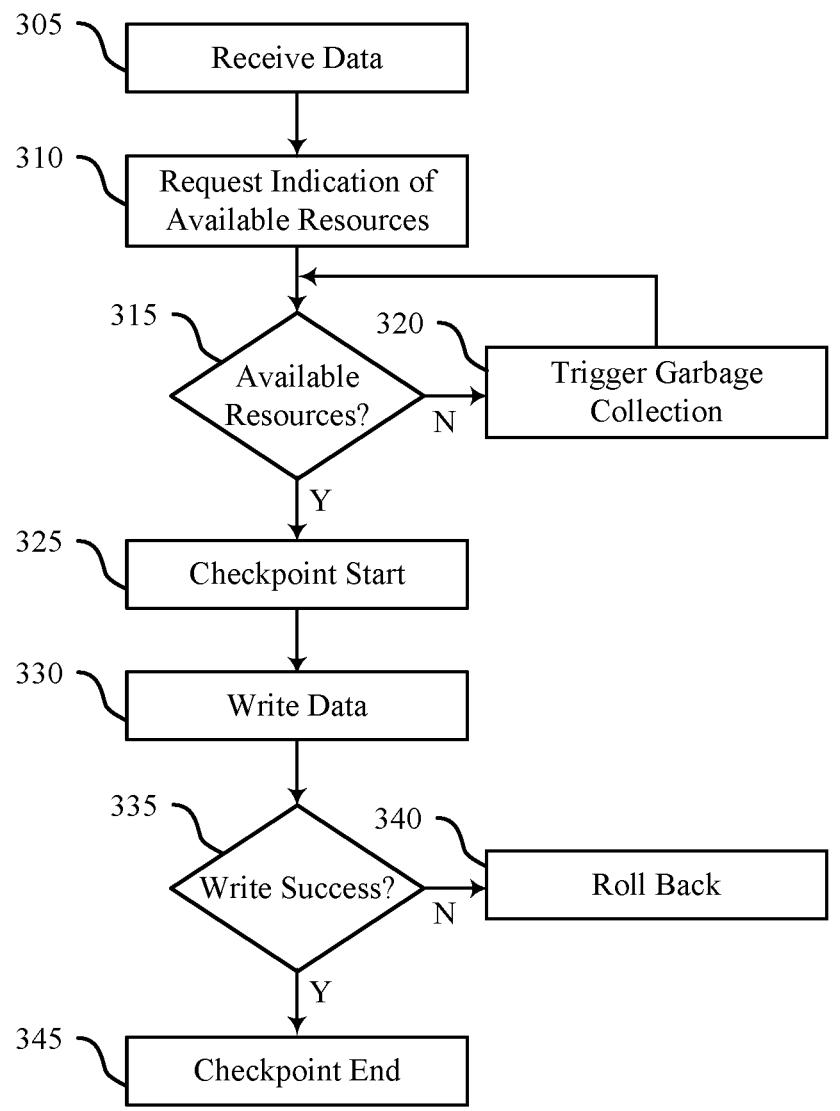

FIG. 3 illustrates an example of a set of operations that supports determining available resources for storing data in accordance with examples as disclosed herein.

Flowchart 300 depicts an example set of operations performed by a host system to support performing garbage collection in advance of performing a programming operation (e.g., an over-the-air update). Aspects of the flowchart 300 may be implemented by a controller, among other components. Additionally or alternatively, aspects of the flowchart 300 may be implemented as instructions stored in memory (e.g., firmware stored in a memory coupled with the host system 105 of FIG. 1). For example, the instructions, when executed by a controller (e.g., at the host system 105), may cause the controller to perform the operations of the flowchart 300.

At block 305, data may be received. In some examples, the data may include information for updating a program (e.g., an operating system) at a device that includes the host system.

At block 310, an indication of available resources at a memory system may be requested. In some examples, the host system transmits a command for reading a register at the memory system that stores the size of the available resources to request the indication. In some examples, the host system transmits a command requesting the size of the available resources from the memory system to request the indication.

At diamond 315, whether the available resources at the memory system are sufficient to support writing the received data to the memory system may be determined.

At block 320, based on or in response to determining that the available resources at the memory system are insufficient for writing the data, a garbage collection operation may be triggered at the memory system. The garbage collection operation may be triggered based on or in response to a command to perform garbage collection for a duration of time. After a completion of the duration, the memory system may transmit an indication of the available resources after the garbage collection to the host system. In some examples, the process associated with determining whether there are available resources and triggering garbage collection continues until there the available resources at the memory system can support the storage of the data.

Alternatively, garbage collection operation may be triggered based on or in response to a command to perform garbage collection until the available resources at the memory system are sufficient for writing the data—e.g., the command may include an indication of the size of the data.

At block 325, based on or in response to determining that the available resources are sufficient for writing the data, a message indicating a beginning of an operation for writing the data to the memory system (which may be referred to as a programming operation) may be transmitted. The message may be referred to as a "checkpoint start" message. In some examples, the memory system may store information (e.g., L2P and validity tables) based on or in response to receiving the checkpoint start message.

At block 330, the data may be written to the memory system—e.g., based on or in response to the checkpoint start message being transmitted. While writing the data, the memory system may update the L2P and validity tables to reflect how the data is written to the memory system.

At diamond 335, a success of writing the data to the memory system may be determined. That is, whether the data was successfully or unsuccessfully written to the memory system may be determined.

At block 340, based on or in response to determining that the data was unsuccessfully written to the memory system, a roll back operation may be triggered at the memory system. In some examples, the data may be unsuccessfully written if the data is corrupted while being written to the memory system—e.g., during transmission or storage of the data. In such cases, the memory system may roll back to a state that preceded the programming operation—e.g., using the stored L2P and validity tables.

In some examples, the memory system may compare the stored L2P and validity tables with the current L2P and validity tables to identify to which logical and/or physical locations in the memory system that the data has been written. In some examples, the memory system may unmap the logical addresses written during the programming operation and designate the physical addresses written during the programming operation as invalid. After completing the roll back operation, the memory system may indicate a success or failure of the roll back operation. In some examples, the host system retries writing the data to the memory system—e.g., if the memory system indicates that the roll back operation failed.

At block 345, a message indicating an end of writing the data to the memory system may be indicated. The message may be referred to as a "checkpoint end" message. In some examples, the memory system may discard the stored L2P and validity tables based on or in response to receiving the checkpoint end message.

Figure 4:
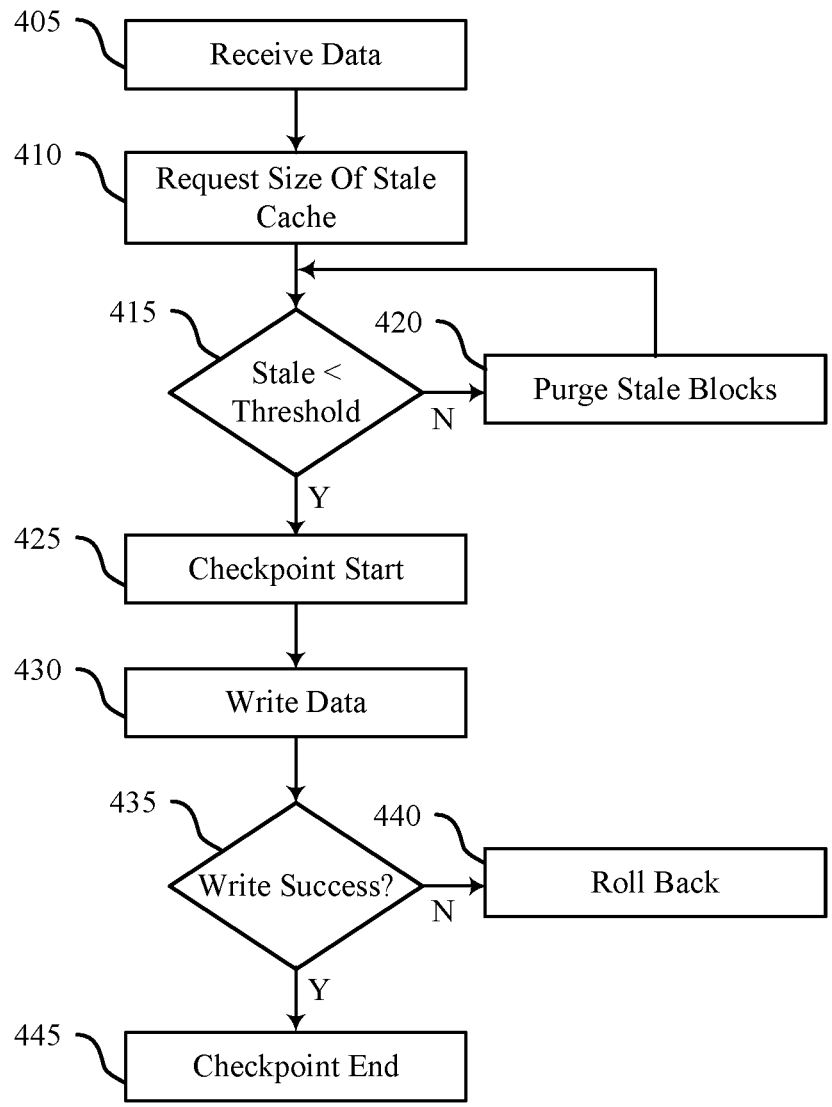

FIG. 4 illustrates an example of a set of operations that supports determining available resources for storing data in accordance with examples as disclosed herein.

Flowchart 400 depicts an example set of operations performed by a host system to support delaying garbage collection until after a programming operation (e.g., an over-the-air update) is completed.

Flowchart 400 depicts an example set of operations performed by a host system to support performing garbage collection in advance of performing a programming operation (e.g., an over-the-air update). Aspects of the flowchart 400 may be implemented by a controller, among other components. Additionally or alternatively, aspects of the flowchart 400 may be implemented as instructions stored in memory (e.g., firmware stored in a memory coupled with the host system 105 of FIG. 1). For example, the instructions, when executed by a controller (e.g., at the host system 105), may cause the controller to perform the operations of the flowchart 400.

At block 405, data may be received at a host system, as similarly described with reference to the operations performed at block 305 of FIG. 3.

At block 410 a size of a stale cache at the memory system may be requested. The stale cache may refer to a set of data at the memory system for which background operations, such as garbage collection, have been disabled. In some examples, the memory system may designate a set of resources as stale. Accordingly, the memory system may refrain from performing garbage collection operations for the set of resources until the designation of the set of resources as stale is changed. The size of the set of resources designated as stale may decrease or increase over time.

At diamond 415, whether there are available resources at the memory system for writing the data may be determined—e.g., based on or in response to comparing a size of the stale cache with a threshold. The threshold may indicate a maximum size to which the stale cache may grow before garbage collection is to be performed. In some examples, the threshold is based on or in response to an amount of available resources at the memory system—e.g., prior to the stale cache being created. For example, the threshold may be set to be ten gigabytes smaller than the size of the available resources at the memory system—e.g., to at least accommodate writing data to the memory system that is smaller than ten gigabytes.

At block 420, based on or in response to determining that the size of the stale cache is greater than the threshold, the logical addresses and/or physical addresses associated with the stale cache may be removed (e.g., purged). Accordingly, the memory system may be able to perform background operations, such as garbage collection, on the blocks used to store data for the logical/physical addresses, as well as for other blocks in the memory system—e.g., to free up additional space. In some examples, the memory system may indicate to the host system that the stale cache has been purged. Accordingly, the host system may again compare the size of the stale cache with the threshold or proceed directly to the next operation.

At block 425, based on or in response to determining that the size of the stale cache is less than the threshold, a message indicating a beginning of an operation for writing the data to the memory system (which may be referred to as a programming operation) may be transmitted, as similarly described with reference to the operations performed at block 325 of FIG. 3. In some examples, the host system may determine that there are sufficient available resources for writing the data to the memory system based on or in response to the size of the stale cache being less than the threshold.

At block 430, the data may be written to the memory system, as similarly described with reference to the operations performed at block 330 of FIG. 3. At diamond 435, a success of writing the data may be determined, as similarly described with reference to the operations performed at diamond 335 of FIG. 3. At block 440, the memory system may be rolled back to a pre-programming state, as similarly described with reference to the operations performed at block 340 of FIG. 3. At block 445, a message indicating an end of writing the data to the memory system may be indicated, as similarly described with reference to the operations performed at block 345 of FIG. 3.

Figure 5:
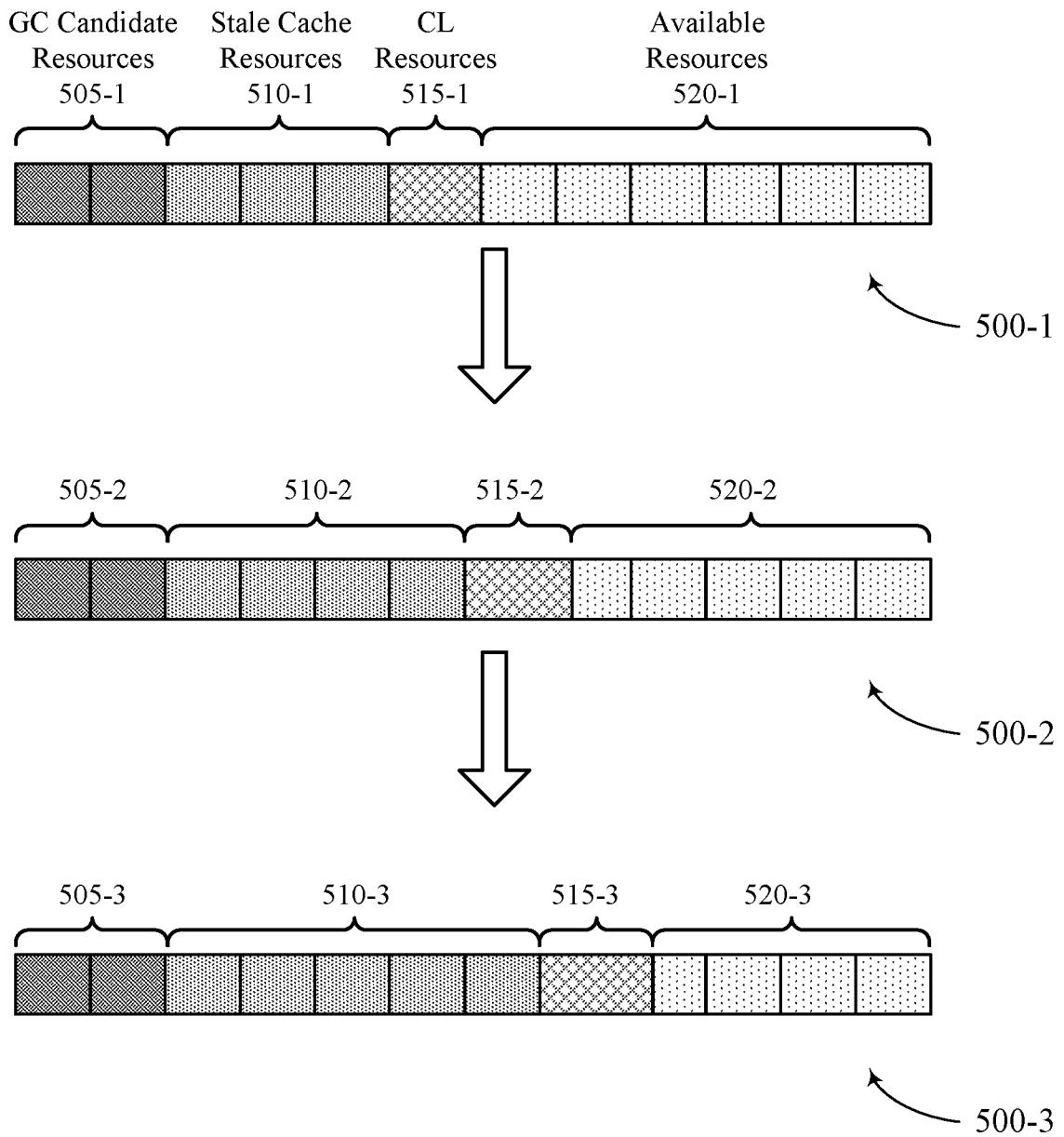
FIG. 5 illustrates an example of a resource diagram that supports determining available resources for storing data in accordance with examples as disclosed herein.

FIG. 5 illustrates an example of a resource diagram that supports determining available resources for storing data in accordance with examples as disclosed herein.

Resource diagrams 500 depict how an allocation of resources may change based on or in response to garbage collection being delayed until after a programming operation (e.g., an over-the-air update) is completed, as described herein and with reference to FIG. 4. The resource diagrams 500 may include garbage collection candidate resources 505 upon which garbage collection may be performed, stale cache resources 510 for which background operations (such as garbage collection) may be delayed (e.g., disabled); change log resources 515 which may be used to store management information (e.g., pre-update L2P tables, current L2P tables, re-update validity tables, current validity tables); and available resources 520 (which may also be referred to as free resources). In some examples, the resource diagrams 500 may also include occupied resources used to store data (e.g., a current version of an operating system or application, operating system data, application data)

First resource diagram 500-1 may depict an allocation of resources after a first set of data is written to a memory system—e.g., after a first update of a larger update is performed. The first set of data may be written to first stale cache resources 510-1. In some examples, before, or after, writing the first set of data to the memory system, the memory system may designate the corresponding set of resources as first stale cache resources 510-1. The memory system may update information stored in first change log resources 515-1 based on or in response to writing the first set of data to first stale cache resources 510-1.

In some examples, the memory system may indicate a size of first stale cache resources 510-1 to a host system—e.g., before the set of data is written and based on or in response to receiving, from the host system, a request for the size of the stale cache. The host system may write the first set of data to first stale cache resources 510-1 based on or in response to determining that the size of the stale cache is less than a threshold. In some examples, the threshold may be based on or in response to the size of first available resources 520-1—e.g., the threshold may equal to or less than (by an offset amount) the size of first available resources 520-1.

Second resource diagram 500-2 may depict an allocation of resources after a second set of data is written to the memory system—e.g., after a second update of the larger update is performed. The second set of data may be written to second stale cache resources 510-2, where second stale cache resources 510-2 may include the resources of first stale cache resources 510-1. The memory system may update information stored in second change log resources 515-2 based on or in response to writing the first set of data to first stale cache resources 510-1. As similarly described above, the memory system may indicate a size of second stale cache resources 510-2 to the host system before the host system writes the second set of data to the memory system.

Third resource diagram 500-3 may depict an allocation of resources after a third set of data is written to the memory system—e.g., after a third update of the larger update is performed. In some examples, the stale cache grows to a size that exceeds the threshold—e.g., the size of third stale cache resources may exceed the threshold after the third set of data is written to the memory system. In such cases, the host system may determine that there is insufficient space for the larger update to be completed for the memory system and may trigger the memory system to purge the stale cache—accordingly, the larger update may fail. Purging the stale cache may include designating third stale cache resources 510-3 as garbage collection candidate resources and performing garbage collection on the current garbage collection candidate resources. In some examples, an increased amount of available resources is present after purging the stale cache (e.g., relative to writing the first update of the larger update to the memory system), and the host system may again attempt to the write the full update to the memory system. In some examples, based on or in response to the larger writing the first update of the larger update—e.g., using L2P and validity tables that were stored prior to writing the first update.

Figure 6:
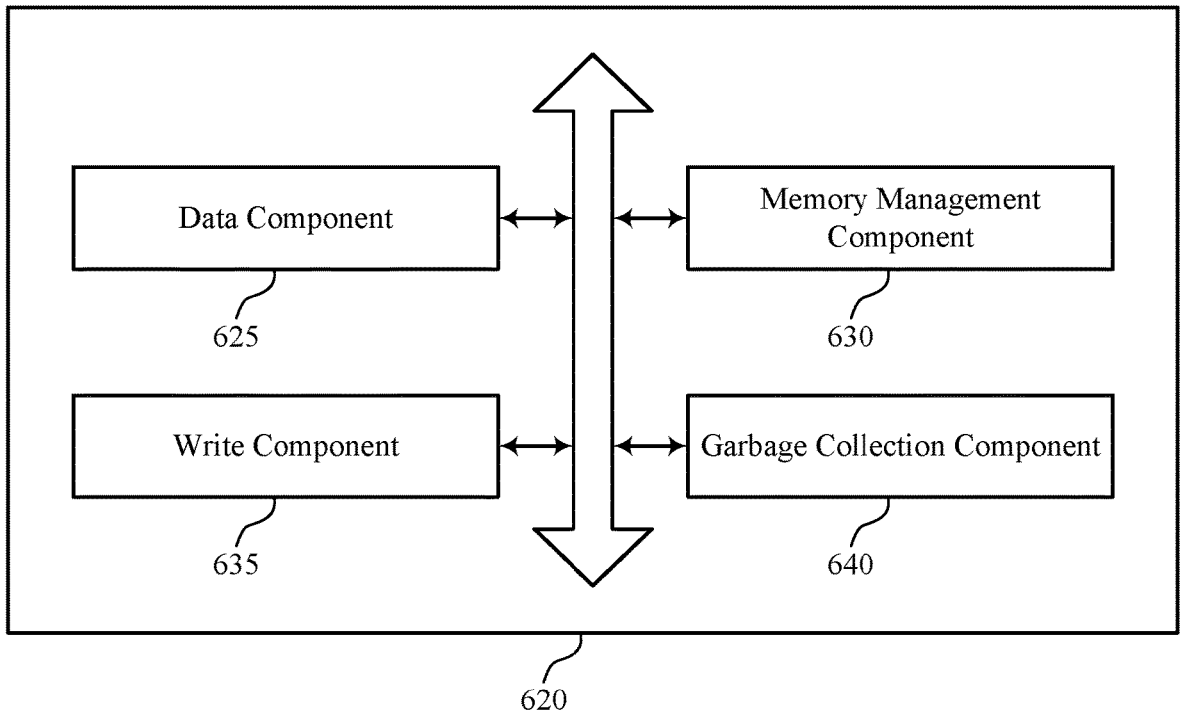
FIG. 6 shows a block diagram of a memory system that supports determining available resources for storing data in accordance with examples as disclosed herein.

FIG. 6 shows a block diagram 600 of a memory system 620 that supports determining available resources for storing data in accordance with examples as disclosed herein. The memory system 620 may be an example of aspects of a memory system as described with reference to FIGS. 1 through 5. The memory system 620, or various components thereof, may be an example of means for performing various aspects of determining available resources for storing data as described herein. For example, the memory system 620 may include a data component 625, a memory management component 630, a write component 635, a garbage collection component 640, or any combination thereof. Each of these components may communicate, directly or indirectly, with one another (e.g., via one or more buses).

The data component 625 may be configured as or otherwise support a means for receiving an indication that data is to be written at a memory system. The memory management component 630 may be configured as or otherwise support a means for removing, based at least in part on the indication that the data is to be written, invalid data at the memory system until a size of available resources at the memory system is greater than or equal to a size of the data. In some examples, the memory management component 630 may be configured as or otherwise support a means for delaying garbage collection operations at the memory system based at least in part on the size of the available resources being greater than or equal to the size of the data after removing the invalid data. The write component 635 may be configured as or otherwise support a means for writing the data to the available resources based at least in part on delaying the garbage collection operations.

In some examples, the memory management component 630 may be configured as or otherwise support a means for transmitting, in response to receiving the indication that the data is to be written, an indication of the size of the available resources at a time prior to the invalid data being removed.

In some examples, the memory management component 630 may be configured as or otherwise support a means for receiving, based at least in part on the indicated size of the available resources being less than the size of the data, a command to remove the invalid data. In some examples, the garbage collection component 640 may be configured as or otherwise support a means for performing a garbage collection operation based at least in part on the command, where at least a portion of the invalid data is removed based at least in part on performing the garbage collection operation. In some examples, the memory management component 630 may be configured as or otherwise support a means for transmitting, based at least in part on a completion of the garbage collection operation and prior to delaying garbage collection operations, a second indication of the size of the available resources.

In some examples, the memory management component 630 may be configured as or otherwise support a means for receiving, based at least in part on the indicated size of the available resources being less than the size of the data, a plurality of commands to remove the invalid data. In some examples, the garbage collection component 640 may be configured as or otherwise support a means for performing a plurality of garbage collection operations based at least in part on the plurality of commands, where the invalid data is removed based at least in part on performing the plurality of garbage collection operations. In some examples, the memory management component 630 may be configured as or otherwise support a means for transmitting, prior to delaying garbage collection operations and after a respective completion of each garbage collection operation of the plurality of garbage collection operations, a resulting indication of the size of the available resources.

In some examples, a last resulting indication of the size of the available resources is transmitted based at least in part on the size of the available resources being greater than or equal to the size of the data.

In some examples, the memory management component 630 may be configured as or otherwise support a means for receiving, based at least in part on the indicated size of the available resources, an indication of the size of the data. In some examples, the garbage collection component 640 may be configured as or otherwise support a means for performing, based at least in part on the size of the data, a plurality of garbage collection operations until the size of the available resources is greater than or equal to the size of the data, where the invalid data is removed based at least in part on performing the plurality of garbage collection operations. In some examples, the memory management component 630 may be configured as or otherwise support a means for transmitting, based at least in part on performing the plurality of garbage collection operations and prior to delaying garbage collection operations, an indication that the size of the available resources is greater than or equal to the size of the data.

In some examples, the memory management component 630 may be configured as or otherwise support a means for determining, based at least in part on performing a last garbage collection of the plurality of garbage collection operations, whether the size of the available resources is greater than or equal to the size of the data, where the indication that the size of the available resources is greater than or equal to the size of the data is transmitted based at least in part on the size of the available resources being greater than or equal to the size of the data.

In some examples, the memory management component 630 may be configured as or otherwise support a means for transmitting, based at least in part on removing the invalid data, an indication that the size of the available resources is greater than or equal to the size of the data.

In some examples, the data component 625 may be configured as or otherwise support a means for receiving, based at least in part on the indicated size of the available resources being greater than or equal to the size of the data, an indication of a beginning of a write operation for the data. In some examples, the data component 625 may be configured as or otherwise support a means for receiving the data based at least in part on receiving the indication of the beginning of the write operation, where writing the data to the available resources is based at least in part on receiving the data.

In some examples, the write component 635 may be configured as or otherwise support a means for transmitting, based at least in part on writing the data to the available resources, an indication that the data was written successfully to the available resources. In some examples, the data component 625 may be configured as or otherwise support a means for receiving, based at least in part on the data being written successfully, an indication of an end of the write operation. In some examples, the garbage collection component 640 may be configured as or otherwise support a means for performing, based at least in part on the end of the write operation, a set of garbage collection operations that were delayed.

In some examples, the memory management component 630 may be configured as or otherwise support a means for storing, based at least in part on receiving the indication of the beginning of the write operation, one or both of a first mapping including first associations between logical addresses and physical addresses at the memory system or a second mapping indicating a validity of data stored at physical addresses at the memory system.

In some examples, the write component 635 may be configured as or otherwise support a means for transmitting, based at least in part on writing the data to the available resources, an indication of a failure of the write operation. In some examples, the memory management component 630 may be configured as or otherwise support a means for replacing, based at least in part on the failure of the write operation, a third mapping including third associations between logical addresses and physical addresses at the memory system with the first mapping and a fourth mapping indicating the validity of data stored at physical addresses at the memory system with the second mapping.

In some examples, the memory management component 630 may be configured as or otherwise support a means for transmitting an indication that the third mapping and fourth mapping have been successfully replaced by the first mapping and the second mapping.

In some examples, the data includes an over-the-air update for the memory system.

In some examples, the memory management component 630 may be configured as or otherwise support a means for delaying garbage collection operations for a set of resources at a memory system. In some examples, the memory management component 630 may be configured as or otherwise support a means for receiving a request for an indication of whether the memory system includes available resources for storing data. In some examples, the memory management component 630 may be configured as or otherwise support a means for transmitting, in response to the request, the indication of whether the memory system includes available resources based at least in part on a comparison of a size of the set of resources with a threshold size. In some examples, the data component 625 may be configured as or otherwise support a means for receiving the data based at least in part on the indicated size of the set of resources being smaller than the threshold size. In some examples, the write component 635 may be configured as or otherwise support a means for writing the data to the set of resources.

In some examples, the memory management component 630 may be configured as or otherwise support a means for delaying garbage collection operations for a second set of resources. In some examples, the memory management component 630 may be configured as or otherwise support a means for receiving a second request for a second indication of whether the memory system includes available resources for storing second data. In some examples, the memory management component 630 may be configured as or otherwise support a means for transmitting, in response to the second request, the second indication of whether the memory system includes available resources based at least in part on a second comparison of the threshold size with a combined size of the set of resources and the second set of resources.

In some examples, the memory management component 630 may be configured as or otherwise support a means for receiving, based at least in part on the indicated combined size being greater than the threshold size, a command to enable garbage collection operations for the set of resources and the second set of resources. In some examples, the garbage collection component 640 may be configured as or otherwise support a means for performing one or more garbage collection operations for the set of resources and the second set of resources based at least in part on the command to enable garbage collection operations.

In some examples, the memory management component 630 may be configured as or otherwise support a means for receiving, based at least in part on the indicated size of the set of resources being less than the threshold size, an indication of a beginning of a write operation for the data. In some examples, the data component 625 may be configured as or otherwise support a means for receiving the data based at least in part on receiving the indication of the beginning of the write operation, where writing the data to the set of resources is based at least in part on receiving the data.

In some examples, the write component 635 may be configured as or otherwise support a means for transmitting, based at least in part on writing the data to the set of resources, an indication that the data was written successfully to the set of resources. In some examples, the data component 625 may be configured as or otherwise support a means for receiving, based at least in part on the data being written successfully, an indication of an end of the write operation. In some examples, the garbage collection component 640 may be configured as or otherwise support a means for performing, based at least in part on indicating the end of the write operation, a set of garbage collection operations that were delayed for the set of resources.

In some examples, the memory management component 630 may be configured as or otherwise support a means for storing, based at least in part on receiving the indication of the beginning of the write operation, one or both of a first mapping including first associations between logical addresses and physical addresses at the memory system or a second mapping indicating a validity of data stored at physical addresses at the memory system.

In some examples, the write component 635 may be configured as or otherwise support a means for transmitting, based at least in part on writing the data to the set of resources, an indication of a failure of the write operation for the data. In some examples, the memory management component 630 may be configured as or otherwise support a means for replacing, based at least in part on the failure of the write operation, a third mapping including third associations between logical addresses and physical addresses at the memory system with the first mapping and a fourth mapping indicating the validity of data stored at physical addresses at the memory system with the second mapping.

In some examples, the memory management component 630 may be configured as or otherwise support a means for transmitting an indication that the third mapping and fourth mapping have been successfully replaced by the first mapping and the second mapping.

In some examples, the threshold size is based at least in part on a size of the available resources at the memory system.

Figure 7:
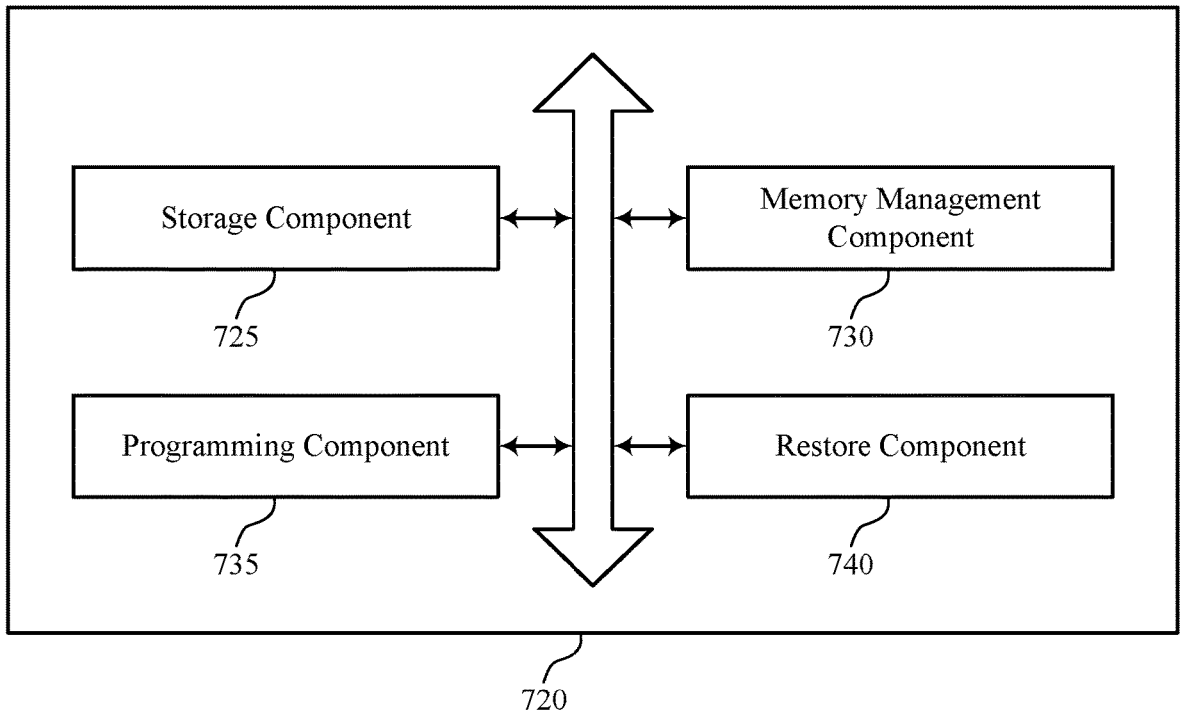
FIG. 7 shows a block diagram of a host system that supports determining available resources for storing data in accordance with examples as disclosed herein.

FIG. 7 shows a block diagram 700 of a host system 720 that supports determining available resources for storing data in accordance with examples as disclosed herein. The host system 720 may be an example of aspects of a host system as described with reference to FIGS. 1 through 5. The host system 720, or various components thereof, may be an example of means for performing various aspects of determining available resources for storing data as described herein. For example, the host system 720 may include a storage component 725, a memory management component 730, a programming component 735, a restore component 740, or any combination thereof. Each of these components may communicate, directly or indirectly, with one another (e.g., via one or more buses).

The storage component 725 may be configured as or otherwise support a means for transmitting a request for a size of available resources at a memory system based at least in part on identifying data to be written at the memory system. In some examples, the storage component 725 may be configured as or otherwise support a means for receiving, in response to the request, an indication of the size of the available resources. In some examples, the storage component 725 may be configured as or otherwise support a means for determining whether the size of the available resources is greater than or equal to a size of the data. The memory management component 730 may be configured as or otherwise support a means for transmitting one or more commands directing the memory system to remove invalid data based at least in part on the size of the available resources being less than the size of the data. In some examples, the storage component 725 may be configured as or otherwise support a means for receiving, in response to the one or more commands, a second indication of the size of the available resources. The programming component 735 may be configured as or otherwise support a means for transmitting, to the memory system, the data based at least in part on the size of the available resources indicated in the second indication of the size of the available resources being greater than or equal to the size of the data.

In some examples, the programming component 735 may be configured as or otherwise support a means for transmitting, based at least in part on the size of the available resources indicated in the second indication being greater than or equal to the size of the data, an indication of a beginning of a write operation for the data.

In some examples, the programming component 735 may be configured as or otherwise support a means for receiving, based at least in part on the transmitting the data, an indication that the data was written successfully. In some examples, the programming component 735 may be configured as or otherwise support a means for transmitting, based at least in part on the data being written successfully, an indication of an end of a write operation for the data.

In some examples, the programming component 735 may be configured as or otherwise support a means for receiving, based at least in part on the transmitting the data, an indication that the data was written improperly. In some examples, the restore component 740 may be configured as or otherwise support a means for transmitting, based at least in part on the indication that the data was written improperly, a second command to restore one or both of a first mapping including associations between logical addresses and physical addresses at the memory system to a first state or a second mapping indicating a validity of data stored at physical addresses at the memory system to a second state, the first state and the second state existing prior to the data being transmitted.

In some examples, the programming component 735 may be configured as or otherwise support a means for receiving, in response to the second command, an indication of a failure to restore one or both of the first mapping to the first state or the second mapping to the second state. In some examples, the restore component 740 may be configured as or otherwise support a means for transmitting, in response to the indication of the failure to restore, an unmap command to invalidate data stored in a set of logical block addresses written with the data. In some examples, the restore component 740 may be configured as or otherwise support a means for transmitting, based at least in part on a completion of the unmap command, the data to the memory system.

In some examples, the storage component 725 may be configured as or otherwise support a means for determining an upper limit for the size of the data, where determining whether the size of the available resources is greater than or equal to the size of the data includes comparing the size of the available resources with the upper limit for the size of the data based at least in part on the size of the data being unknown.

In some examples, the storage component 725 may be configured as or otherwise support a means for identifying a set of resources at a memory system for which garbage collection operations are delayed based at least in part on data to be written at the memory system. In some examples, the storage component 725 may be configured as or otherwise support a means for transmitting a request for an indication of whether the memory system includes available resources for storing the data. In some examples, the storage component 725 may be configured as or otherwise support a means for receiving, in response to the request, the indication of whether the memory system includes available resources. In some examples, the programming component 735 may be configured as or otherwise support a means for transmitting the data based at least in part on the memory system including available resources for storing the data.

In some examples, the memory management component 730 may be configured as or otherwise support a means for transmitting a command to delay garbage collection operations for a second set of resources based at least in part on second data to be written at the memory system. In some examples, the storage component 725 may be configured as or otherwise support a means for transmitting a second request for a second indication of whether the memory system includes available resources for storing the second data. In some examples, the storage component 725 may be configured as or otherwise support a means for receiving, in response to the second request, the second indication of whether the memory system includes available resources, the second indication being based at least in part on a threshold size and a combined size of the set of resources and the second set of resources.

In some examples, the memory management component 730 may be configured as or otherwise support a means for transmitting, based at least in part on the indicated combined size being greater than the threshold size, a second command to enable garbage collection operations for the set of resources and the second set of resources.

Figure 8:
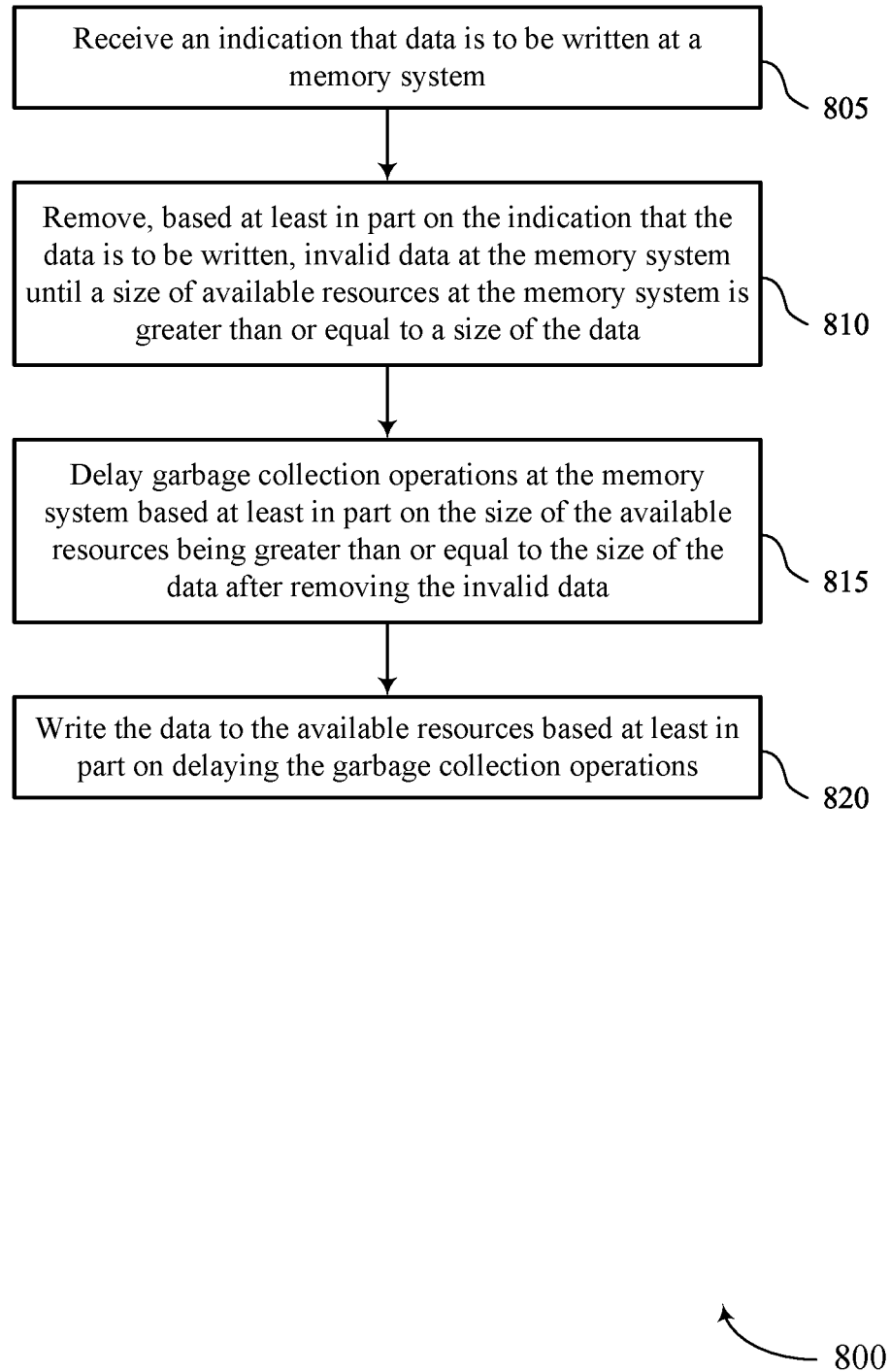
FIGS. 8 through 11 show flowcharts illustrating a method or methods that support determining available resources for storing data in accordance with examples as disclosed herein.

FIG. 8 shows a flowchart illustrating a method 800 that supports determining available resources for storing data in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include receiving an indication that data is to be written at a memory system. The operations of 805 may be performed in accordance with examples as disclosed herein. In some examples, aspects of the operations of 805 may be performed by a data component 625 as described with reference to FIG. 6.

At 810, the method may include removing, based at least in part on the indication that the data is to be written, invalid data at the memory system until a size of available resources at the memory system is greater than or equal to a size of the data. The operations of 810 may be performed in accordance with examples as disclosed herein. In some examples, aspects of the operations of 810 may be performed by a memory management component 630 as described with reference to FIG. 6.

At 815, the method may include delaying garbage collection operations at the memory system based at least in part on the size of the available resources being greater than or equal to the size of the data after removing the invalid data. The operations of 815 may be performed in accordance with examples as disclosed herein. In some examples, aspects of the operations of 815 may be performed by a memory management component 630 as described with reference to FIG. 6.

At 820, the method may include writing the data to the available resources based at least in part on delaying the garbage collection operations. The operations of 820 may be performed in accordance with examples as disclosed herein. In some examples, aspects of the operations of 820 may be performed by a write component 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving an indication that data is to be written at a memory system, removing, based at least in part on the indication that the data is to be written, invalid data at the memory system until a size of available resources at the memory system is greater than or equal to a size of the data, delaying garbage collection operations at the memory system based at least in part on the size of the available resources being greater than or equal to the size of the data after removing the invalid data, and writing the data to the available resources based at least in part on delaying the garbage collection operations.

Some examples of the method 800 and the apparatus described herein may further include operations, features, circuitry, logic, means, or instructions for transmitting, in response to receiving the indication that the data may be to be written, an indication of the size of the available resources at a time prior to the invalid data being removed.

Some examples of the method 800 and the apparatus described herein may further include operations, features, circuitry, logic, means, or instructions for receiving, based at least in part on the indicated size of the available resources being less than the size of the data, a command to remove the invalid data, performing a garbage collection operation based at least in part on the command, where at least a portion of the invalid data may be removed based at least in part on performing the garbage collection operation, and transmitting, based at least in part on a completion of the garbage collection operation and prior to delaying garbage collection operations, a second indication of the size of the available resources.

Some examples of the method 800 and the apparatus described herein may further include operations, features, circuitry, logic, means, or instructions for receiving, based at least in part on the indicated size of the available resources being less than the size of the data, a plurality of commands to remove the invalid data, performing a plurality of garbage collection operations based at least in part on the plurality of commands, where the invalid data may be removed based at least in part on performing the plurality of garbage collection operations, and transmitting, prior to delaying garbage collection operations and after a respective completion of each garbage collection operation of the plurality of garbage collection operations, a resulting indication of the size of the available resources.

In some examples of the method 800 and the apparatus described herein, a last resulting indication of the size of the available resources may be transmitted based at least in part on the size of the available resources being greater than or equal to the size of the data.

Some examples of the method 800 and the apparatus described herein may further include operations, features, circuitry, logic, means, or instructions for receiving, based at least in part on the indicated size of the available resources, an indication of the size of the data, performing, based at least in part on the size of the data, a plurality of garbage collection operations until the size of the available resources may be greater than or equal to the size of the data, where the invalid data may be removed based at least in part on performing the plurality of garbage collection operations, and transmitting, based at least in part on performing the plurality of garbage collection operations and prior to delaying garbage collection operations, an indication that the size of the available resources may be greater than or equal to the size of the data.

Some examples of the method 800 and the apparatus described herein may further include operations, features, circuitry, logic, means, or instructions for determining, based at least in part on performing a last garbage collection of the plurality of garbage collection operations, whether the size of the available resources may be greater than or equal to the size of the data, where the indication that the size of the available resources may be greater than or equal to the size of the data may be transmitted based at least in part on the size of the available resources being greater than or equal to the size of the data.

Some examples of the method 800 and the apparatus described herein may further include operations, features, circuitry, logic, means, or instructions for transmitting, based at least in part on removing the invalid data, an indication that the size of the available resources may be greater than or equal to the size of the data.

Some examples of the method 800 and the apparatus described herein may further include operations, features, circuitry, logic, means, or instructions for receiving, based at least in part on the indicated size of the available resources being greater than or equal to the size of the data, an indication of a beginning of a write operation for the data and receiving the data based at least in part on receiving the indication of the beginning of the write operation, where writing the data to the available resources may be based at least in part on receiving the data.

Some examples of the method 800 and the apparatus described herein may further include operations, features, circuitry, logic, means, or instructions for transmitting, based at least in part on writing the data to the available resources, an indication that the data was written successfully to the available resources, receiving, based at least in part on the data being written successfully, an indication of an end of the write operation, and performing, based at least in part on the end of the write operation, a set of garbage collection operations that were delayed.

Some examples of the method 800 and the apparatus described herein may further include operations, features, circuitry, logic, means, or instructions for storing, based at least in part on receiving the indication of the beginning of the write operation, one or both of a first mapping including first associations between logical addresses and physical addresses at the memory system or a second mapping indicating a validity of data stored at physical addresses at the memory system.

Some examples of the method 800 and the apparatus described herein may further include operations, features, circuitry, logic, means, or instructions for transmitting, based at least in part on writing the data to the available resources, an indication of a failure of the write operation and replacing, based at least in part on the failure of the write operation, a third mapping including third associations between logical addresses and physical addresses at the memory system with the first mapping and a fourth mapping indicating the validity of data stored at physical addresses at the memory system with the second mapping.

Some examples of the method 800 and the apparatus described herein may further include operations, features, circuitry, logic, means, or instructions for transmitting an indication that the third mapping and fourth mapping may have been successfully replaced by the first mapping and the second mapping.

In some examples of the method 800 and the apparatus described herein, the data includes an over-the-air update for the memory system.

Figure 9:
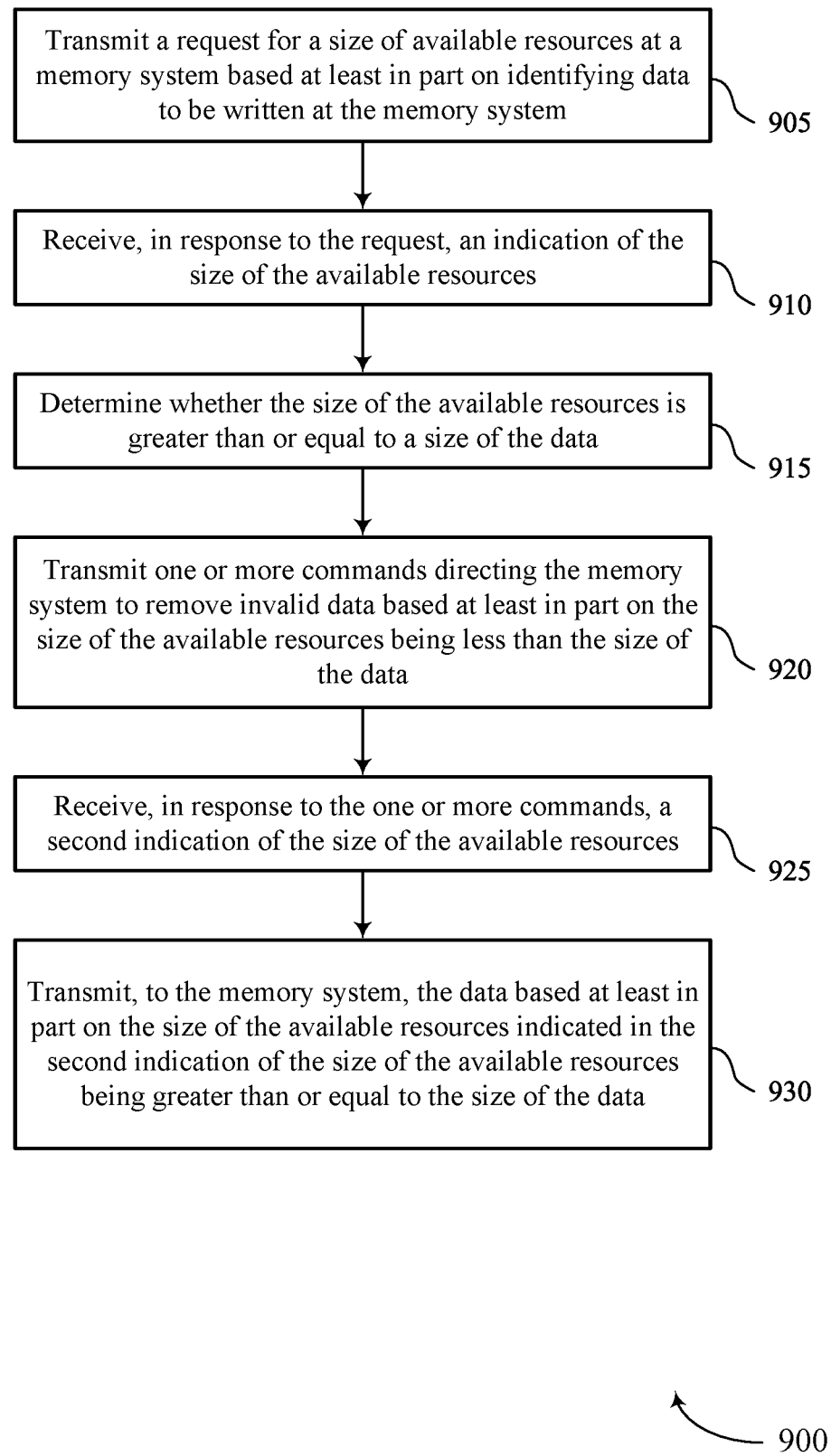

FIG. 9 shows a flowchart illustrating a method 900 that supports determining available resources for storing data in accordance with examples as disclosed herein. The operations of method 900 may be implemented by a host system or its components as described herein. For example, the operations of method 900 may be performed by a host system as described with reference to FIGS. 1 through 5 and 7. In some examples, a host system may execute a set of instructions to control the functional elements of the device to perform the described functions. Additionally, or alternatively, the host system may perform aspects of the described functions using special-purpose hardware.

At 905, the method may include transmitting a request for a size of available resources at a memory system based at least in part on identifying data to be written at the memory system. The operations of 905 may be performed in accordance with examples as disclosed herein. In some examples, aspects of the operations of 905 may be performed by a storage component 725 as described with reference to FIG. 7.

At 910, the method may include receiving, in response to the request, an indication of the size of the available resources. The operations of 910 may be performed in accordance with examples as disclosed herein. In some examples, aspects of the operations of 910 may be performed by a storage component 725 as described with reference to FIG. 7.

At 915, the method may include determining whether the size of the available resources is greater than or equal to a size of the data. The operations of 915 may be performed in accordance with examples as disclosed herein. In some examples, aspects of the operations of 915 may be performed by a storage component 725 as described with reference to FIG. 7.

At 920, the method may include transmitting one or more commands directing the memory system to remove invalid data based at least in part on the size of the available resources being less than the size of the data. The operations of 920 may be performed in accordance with examples as disclosed herein. In some examples, aspects of the operations of 920 may be performed by a memory management component 730 as described with reference to FIG. 7.

At 925, the method may include receiving, in response to the one or more commands, a second indication of the size of the available resources. The operations of 925 may be performed in accordance with examples as disclosed herein. In some examples, aspects of the operations of 925 may be performed by a storage component 725 as described with reference to FIG. 7.

At 930, the method may include transmitting, to the memory system, the data based at least in part on the size of the available resources indicated in the second indication of the size of the available resources being greater than or equal to the size of the data. The operations of 930 may be performed in accordance with examples as disclosed herein. In some examples, aspects of the operations of 930 may be performed by a programming component 735 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for transmitting a request for a size of available resources at a memory system based at least in part on identifying data to be written at the memory system, receiving, in response to the request, an indication of the size of the available resources, determining whether the size of the available resources is greater than or equal to a size of the data, transmitting one or more commands directing the memory system to remove invalid data based at least in part on the size of the available resources being less than the size of the data, receiving, in response to the one or more commands, a second indication of the size of the available resources, and transmitting, to the memory system, the data based at least in part on the size of the available resources indicated in the second indication of the size of the available resources being greater than or equal to the size of the data.

Some examples of the method 900 and the apparatus described herein may further include operations, features, circuitry, logic, means, or instructions for transmitting, based at least in part on the size of the available resources indicated in the second indication being greater than or equal to the size of the data, an indication of a beginning of a write operation for the data.

Some examples of the method 900 and the apparatus described herein may further include operations, features, circuitry, logic, means, or instructions for receiving, based at least in part on the transmitting the data, an indication that the data was written successfully and transmitting, based at least in part on the data being written successfully, an indication of an end of a write operation for the data.

Some examples of the method 900 and the apparatus described herein may further include operations, features, circuitry, logic, means, or instructions for receiving, based at least in part on the transmitting the data, an indication that the data was written improperly and transmitting, based at least in part on the indication that the data was written improperly, a second command to restore one or both of a first mapping including associations between logical addresses and physical addresses at the memory system to a first state or a second mapping indicating a validity of data stored at physical addresses at the memory system to a second state, the first state and the second state existing prior to the data being transmitted.

Some examples of the method 900 and the apparatus described herein may further include operations, features, circuitry, logic, means, or instructions for receiving, in response to the second command, an indication of a failure to restore one or both of the first mapping to the first state or the second mapping to the second state, transmitting, in response to the indication of the failure to restore, an unmap command to invalidate data stored in a set of logical block addresses written with the data, and transmitting, based at least in part on a completion of the unmap command, the data to the memory system.

Some examples of the method 900 and the apparatus described herein may further include operations, features, circuitry, logic, means, or instructions for determining an upper limit for the size of the data, where determining whether the size of the available resources may be greater than or equal to the size of the data includes comparing the size of the available resources with the upper limit for the size of the data based at least in part on the size of the data being unknown.

Figure 10:
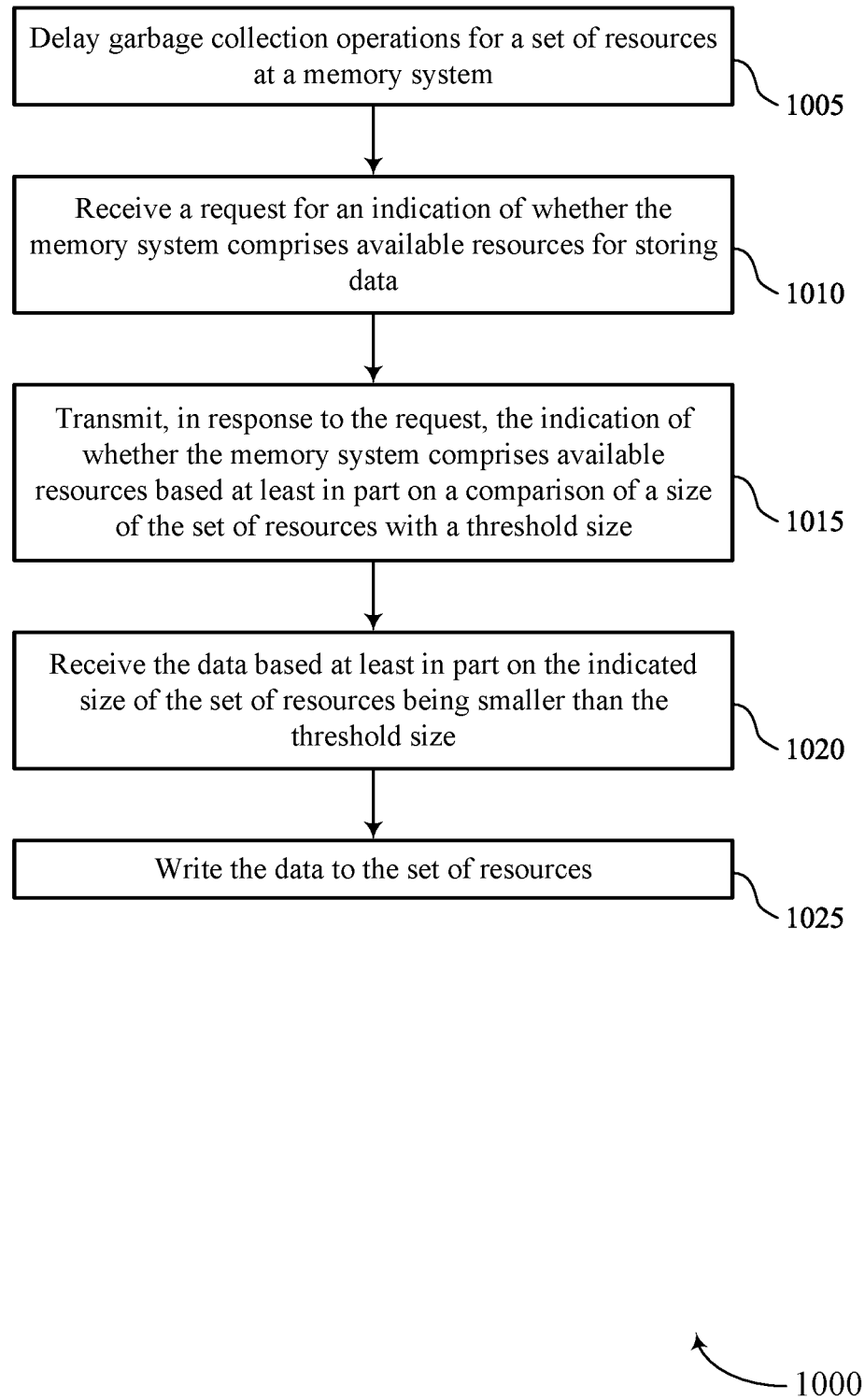

FIG. 10 shows a flowchart illustrating a method 1000 that supports determining available resources for storing data in accordance with examples as disclosed herein. The operations of method 1000 may be implemented by a memory system or its components as described herein. For example, the operations of method 1000 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 1005, the method may include delaying garbage collection operations for a set of resources at a memory system. The operations of 1005 may be performed in accordance with examples as disclosed herein. In some examples, aspects of the operations of 1005 may be performed by a memory management component 630 as described with reference to FIG. 6.

At 1010, the method may include receiving a request for an indication of whether the memory system includes available resources for storing data. The operations of 1010 may be performed in accordance with examples as disclosed herein. In some examples, aspects of the operations of 1010 may be performed by a memory management component 630 as described with reference to FIG. 6.

At 1015, the method may include transmitting, in response to the request, the indication of whether the memory system includes available resources based at least in part on a comparison of a size of the set of resources with a threshold size. The operations of 1015 may be performed in accordance with examples as disclosed herein. In some examples, aspects of the operations of 1015 may be performed by a memory management component 630 as described with reference to FIG. 6.

At 1020, the method may include receiving the data based at least in part on the indicated size of the set of resources being smaller than the threshold size. The operations of 1020 may be performed in accordance with examples as disclosed herein. In some examples, aspects of the operations of 1020 may be performed by a data component 625 as described with reference to FIG. 6.

At 1025, the method may include writing the data to the set of resources. The operations of 1025 may be performed in accordance with examples as disclosed herein. In some examples, aspects of the operations of 1025 may be performed by a write component 635 as described with reference to FIG. 6.

In some examples, an apparatus as described herein may perform a method or methods, such as the method 1000. The apparatus may include, features, circuitry, logic, means, or instructions (e.g., a non-transitory computer-readable medium storing instructions executable by a processor) for delaying garbage collection operations for a set of resources at a memory system, receiving a request for an indication of whether the memory system includes available resources for storing data, transmitting, in response to the request, the indication of whether the memory system includes available resources based at least in part on a comparison of a size of the set of resources with a threshold size, receiving the data based at least in part on the indicated size of the set of resources being smaller than the threshold size, and writing the data to the set of resources.

Some examples of the method 1000 and the apparatus described herein may further include operations, features, circuitry, logic, means, or instructions for delaying garbage collection operations for a second set of resources, receiving a second request for a second indication of whether the memory system includes available resources for storing second data, and transmitting, in response to the second request, the second indication of whether the memory system includes available resources based at least in part on a second comparison of the threshold size with a combined size of the set of resources and the second set of resources.

Some examples of the method 1000 and the apparatus described herein may further include operations, features, circuitry, logic, means, or instructions for receiving, based at least in part on the indicated combined size being greater than the threshold size, a command to enable garbage collection operations for the set of resources and the second set of resources and performing one or more garbage collection operations for the set of resources and the second set of resources based at least in part on the command to enable garbage collection operations.

Some examples of the method 1000 and the apparatus described herein may further include operations, features, circuitry, logic, means, or instructions for receiving, based at least in part on the indicated size of the set of resources being less than the threshold size, an indication of a beginning of a write operation for the data and receiving the data based at least in part on receiving the indication of the beginning of the write operation, where writing the data to the set of resources may be based at least in part on receiving the data.

Some examples of the method 1000 and the apparatus described herein may further include operations, features, circuitry, logic, means, or instructions for transmitting, based at least in part on writing the data to the set of resources, an indication that the data was written successfully to the set of resources, receiving, based at least in part on the data being written successfully, an indication of an end of the write operation, and performing, based at least in part on indicating the end of the write operation, a set of garbage collection operations that were delayed for the set of resources.

Some examples of the method 1000 and the apparatus described herein may further include operations, features, circuitry, logic, means, or instructions for storing, based at least in part on receiving the indication of the beginning of the write operation, one or both of a first mapping including first associations between logical addresses and physical addresses at the memory system or a second mapping indicating a validity of data stored at physical addresses at the memory system.

Some examples of the method 1000 and the apparatus described herein may further include operations, features, circuitry, logic, means, or instructions for transmitting, based at least in part on writing the data to the set of resources, an indication of a failure of the write operation for the data and replacing, based at least in part on the failure of the write operation, a third mapping including third associations between logical addresses and physical addresses at the memory system with the first mapping and a fourth mapping indicating the validity of data stored at physical addresses at the memory system with the second mapping.

Some examples of the method 1000 and the apparatus described herein may further include operations, features, circuitry, logic, means, or instructions for transmitting an indication that the third mapping and fourth mapping may have been successfully replaced by the first mapping and the second mapping.

In some examples of the method 1000 and the apparatus described herein, the threshold size may be based at least in part on a size of the available resources at the memory system.

Figure 11:
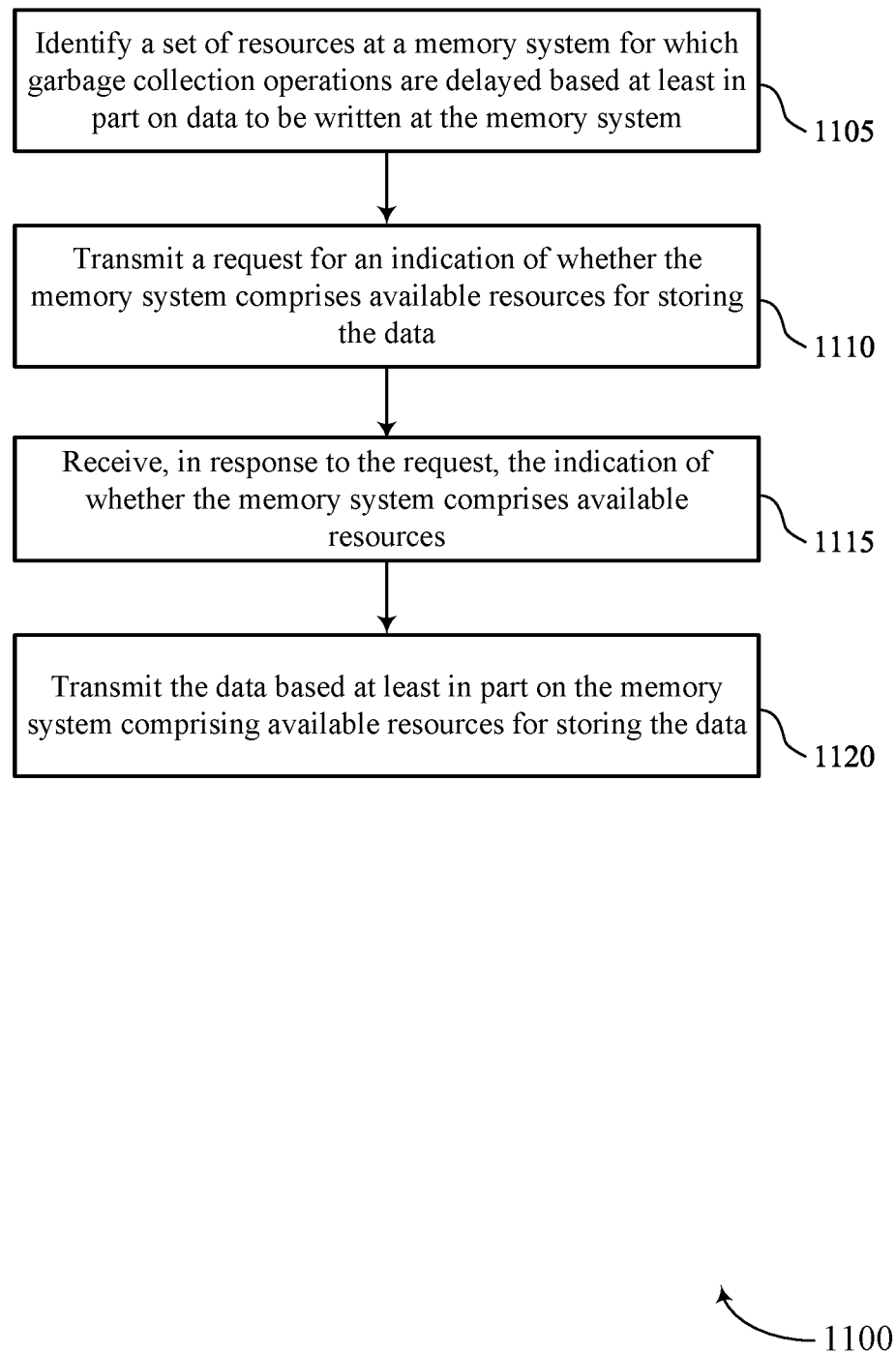

FIG. 11 shows a flowchart illustrating a method 1100 that supports determining available resources for storing data in accordance with examples as disclosed herein. The operations of method 1100 may be implemented by a host system or its components as described herein. For example, the operations of method 1100 may be performed by a host system as described with reference to FIGS. 1 through 5 and 7. In some examples, a host system may execute a set of instructions to control the functional elements of the device to perform the described functions. Additionally, or alternatively, the host system may perform aspects of the described functions using special-purpose hardware.

At 1105, the method may include identifying a set of resources at a memory system for which garbage collection operations are delayed based at least in part on data to be written at the memory system. The operations of 1105 may be performed in accordance with examples as disclosed herein. In some examples, aspects of the operations of 1105 may be performed by a storage component 725 as described with reference to FIG. 7.

At 1110, the method may include transmitting a request for an indication of whether the memory system includes available resources for storing the data. The operations of 1110 may be performed in accordance with examples as disclosed herein. In some examples, aspects of the operations of 1110 may be performed by a storage component 725 as described with reference to FIG. 7.

At 1115, the method may include receiving, in response to the request, the indication of whether the memory system includes available resources. The operations of 1115 may be performed in accordance with examples as disclosed herein. In some examples, aspects of the operations of 1115 may be performed by a storage component 725 as described with reference to FIG. 7.

At 1120, the method may include transmitting the data based at least in part on the memory system including available resources for storing the data. The operations of 1120 may be performed in accordance with examples as disclosed herein. In some examples, aspects of the operations of 1120 may be performed by a programming component 735 as described with reference to FIG. 7.

In some examples, an apparatus as described herein may perform a method or methods, such as the method 1100. The apparatus may include, features, circuitry, logic, means, or instructions (e.g., a non-transitory computer-readable medium storing instructions executable by a processor) for identifying a set of resources at a memory system for which garbage collection operations are delayed based at least in part on data to be written at the memory system, transmitting a request for an indication of whether the memory system includes available resources for storing the data, receiving, in response to the request, the indication of whether the memory system includes available resources, and transmitting the data based at least in part on the memory system including available resources for storing the data.

Some examples of the method 1100 and the apparatus described herein may further include operations, features, circuitry, logic, means, or instructions for transmitting a command to delay garbage collection operations for a second set of resources based at least in part on second data to be written at the memory system, transmitting a second request for a second indication of whether the memory system includes available resources for storing the second data, and receiving, in response to the second request, the second indication of whether the memory system includes available resources, the second indication being based at least in part on a threshold size and a combined size of the set of resources and the second set of resources.

Some examples of the method 1100 and the apparatus described herein may further include operations, features, circuitry, logic, means, or instructions for transmitting, based at least in part on the indicated combined size being greater than the threshold size, a second command to enable garbage collection operations for the set of resources and the second set of resources.

It should be noted that the methods described above describe possible implementations, and that the operations and the steps may be rearranged or otherwise modified and that other implementations are possible. Further, portions from two or more of the methods may be combined.

Another apparatus is described. The apparatus may include a memory device, a controller coupled with the memory device and configured to cause the apparatus to receive an indication that data is to be written at a memory system including the memory device, remove, based at least in part on the indication that the data is to be written, invalid data at the memory system until a size of available resources at the memory system is greater than or equal to a size of the data, delay garbage collection operations at the memory system based at least in part on the size of the available resources being greater than or equal to the size of the data after removing the invalid data, and write the data to the available resources based at least in part on delaying the garbage collection operations.

In some examples, the controller may be further configured to cause the apparatus to transmit, in response to receiving the indication that the data may be to be written, an indication of the size of the available resources at a time prior to the invalid data being removed.

In some examples, the controller may be further configured to cause the apparatus to receive, based at least in part on the indicated size of the available resources being less than the size of the data, a command to remove the invalid data, perform a garbage collection operation based at least in part on the command, where a portion of the invalid data may be removed based at least in part on performing the garbage collection operation, and transmit, based at least in part on a completion of the garbage collection operation and prior to delaying garbage collection operations, a second indication of the size of the available resources.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   at least one memory device; and
   at least one controller coupled with the at least one memory device and configured to cause the apparatus to:
   receive an indication that a set of data is to be written at a memory system comprising the at least one memory device;
   remove, based at least in part on the indication that the set of data is to be written, invalid data at the memory system until a size of available resources at the memory system is greater than or equal to a size of the set of data;
   delay garbage collection operations at the memory system based at least in part on the size of the available resources being greater than or equal to the size of the set of data after removing the invalid data;
   transmit, based at least in part on removing the invalid data, an indication that the size of the available resources is greater than or equal to the size of the set of data;
   receive, based at least in part on the indicated size of the available resources being greater than or equal to the size of the set of data, an indication of a beginning of a write operation for the set of data;
   receive the set of data based at least in part on receiving the indication of the beginning of the write operation; and
   write, based at least in part on receiving the set of data, the set of data to the available resources based at least in part on delaying the garbage collection operations.

2. The apparatus of claim 1, wherein the at least one controller is further configured to cause the apparatus to:
   transmit, in response to receiving the indication that the set of data is to be written, an indication of the size of the available resources at a time prior to the invalid data being removed.

3. The apparatus of claim 2, wherein the at least one controller is further configured to cause the apparatus to:
   receive, based at least in part on the indicated size of the available resources being less than the size of the set of data, a command to remove the invalid data;
   perform a garbage collection operation based at least in part on the command, wherein at least a portion of the invalid data is removed based at least in part on performing the garbage collection operation; and
   transmit, based at least in part on a completion of the garbage collection operation and prior to delaying the garbage collection operations, a second indication of the size of the available resources.

4. The apparatus of claim 2, wherein the at least one controller is further configured to cause the apparatus to:
   receive, based at least in part on the indicated size of the available resources being less than the size of the set of data, a plurality of commands to remove the invalid data;
   perform a plurality of garbage collection operations based at least in part on the plurality of commands, wherein the invalid data is removed based at least in part on performing the plurality of garbage collection operations; and
   transmit, prior to delaying the garbage collection operations and after a respective completion of each garbage collection operation of the plurality of garbage collection operations, a resulting indication of the size of the available resources.

5. The apparatus of claim 4, wherein a last resulting indication of the size of the available resources is transmitted based at least in part on the size of the available resources being greater than or equal to the size of the set of data.

6. The apparatus of claim 2, wherein the at least one controller is further configured to cause the apparatus to:
   receive, based at least in part on the indicated size of the available resources, an indication of the size of the set of data;
   perform, based at least in part on the size of the set of data, a plurality of garbage collection operations until the size of the available resources is greater than or equal to the size of the set of data, wherein the invalid data is removed based at least in part on performing the plurality of garbage collection operations; and
   transmit, based at least in part on performing the plurality of garbage collection operations and prior to delaying the garbage collection operations, an indication that the size of the available resources is greater than or equal to the size of the set of data.

7. The apparatus of claim 6, wherein the at least one controller is further configured to cause the apparatus to:
   determine, based at least in part on performing a last garbage collection operation of the plurality of garbage collection operations, whether the size of the available resources is greater than or equal to the size of the set of data, wherein the indication that the size of the available resources is greater than or equal to the size of the set of data is transmitted based at least in part on the size of the available resources being greater than or equal to the size of the set of data.

8. The apparatus of claim 1, wherein the at least one controller is further configured to cause the apparatus to:
   transmit, based at least in part on writing the set of data to the available resources, an indication that the set of data was written successfully to the available resources;
   receive, based at least in part on the set of data being written successfully, an indication of an end of the write operation; and
   perform, based at least in part on the end of the write operation, a set of garbage collection operations that were delayed.

9. The apparatus of claim 1, wherein the at least one controller is further configured to cause the apparatus to:
   store, based at least in part on receiving the indication of the beginning of the write operation, one or both of a first mapping comprising first associations between logical addresses and physical addresses at the memory system or a second mapping indicating a validity of data stored at physical addresses at the memory system.

10. The apparatus of claim 9, wherein the at least one controller is further configured to cause the apparatus to:
    transmit, based at least in part on writing the set of data to the available resources, an indication of a failure of the write operation; and
    replace, based at least in part on the failure of the write operation, a third mapping comprising third associations between logical addresses and physical addresses at the memory system with the first mapping and a fourth mapping indicating the validity of data stored at physical addresses at the memory system with the second mapping.

11. The apparatus of claim 10, wherein the at least one controller is further configured to cause the apparatus to:
    transmit an indication that the third mapping and fourth mapping have been successfully replaced by the first mapping and the second mapping.

12. The apparatus of claim 1, wherein the set of data comprises an over-the-air update for the memory system.

13. An apparatus, comprising:
    at least one controller configured to cause the apparatus to:
    transmit a request for a size of available resources at a memory system based at least in part on identifying a set of data to be written at the memory system;
    receive, in response to the request, an indication of the size of the available resources;
    determine whether the size of the available resources is greater than or equal to a size of the set of data;
    transmit one or more commands directing the memory system to remove invalid data based at least in part on the size of the available resources being less than the size of the set of data;
    receive, in response to the one or more commands, a second indication of the size of the available resources;
    transmit, based at least in part on the size of the available resources indicated in the second indication of the size of the available resources being greater than or equal to the size of the set of data, an indication of a beginning of a write operation for the set of data; and
    transmit, to the memory system and based at least in part on the indication of the beginning of the write operation, the set of data based at least in part on the size of the available resources indicated in the second indication of the size of the available resources being greater than or equal to the size of the set of data.

14. An apparatus, comprising:
    at least one controller configured to cause the apparatus to:
    transmit a request for a size of available resources at a memory system based at least in part on identifying a set of data to be written at the memory system;
    receive, in response to the request, an indication of the size of the available resources;
    determine whether the size of the available resources is greater than or equal to a size of the set of data;
    transmit one or more commands directing the memory system to remove invalid data based at least in part on the size of the available resources being less than the size of the set of data;
    receive, in response to the one or more commands, a second indication of the size of the available resources;
    transmit, to the memory system, the set of data based at least in part on the size of the available resources indicated in the second indication of the size of the available resources being greater than or equal to the size of the set of data;
    receive, based at least in part on transmitting the set of data, an indication that the set of data was written successfully; and
    transmit, based at least in part on the set of data being written successfully, an indication of an end of a write operation for the set of data.

15. An apparatus, comprising:
    at least one controller configured to cause the apparatus to:
    transmit a request for a size of available resources at a memory system based at least in part on identifying a set of data to be written at the memory system;
    receive, in response to the request, an indication of the size of the available resources;
    determine whether the size of the available resources is greater than or equal to a size of the set of data;

transmit one or more commands directing the memory system to remove invalid data based at least in part on the size of the available resources being less than the size of the set of data;
receive, in response to the one or more commands, a second indication of the size of the available resources;
transmit, to the memory system, the set of data based at least in part on the size of the available resources indicated in the second indication of the size of the available resources being greater than or equal to the size of the set of data;
receive, based at least in part on transmitting the set of data, an indication that the set of data was written improperly; and
transmit, based at least in part on the indication that the set of data was written improperly, a second command to restore one or both of a first mapping comprising associations between logical addresses and physical addresses at the memory system to a first state or a second mapping indicating a validity of data stored at physical addresses at the memory system to a second state, the first state and the second state existing prior to the set of data being transmitted.

16. The apparatus of claim 15, wherein the at least one controller is further configured to cause the apparatus to:
receive, in response to the second command, an indication of a failure to restore one or both of the first mapping to the first state or the second mapping to the second state;
transmit, in response to the indication of the failure to restore, an unmap command to invalidate data stored in a set of logical block addresses written with the set of data; and
transmit, based at least in part on a completion of the unmap command, the set of data to the memory system.

17. An apparatus, comprising:
at least one controller configured to cause the apparatus to:
transmit a request for a size of available resources at a memory system based at least in part on identifying a set of data to be written at the memory system;
receive, in response to the request, an indication of the size of the available resources;
determine an upper limit for a size of the set of data based at least in part on the size of the set of data being unknown;
determine whether the size of the available resources is greater than or equal to the size of the set of data based at least in part on a comparison of the size of the available resources with the upper limit for the size of the set of data;
transmit one or more commands directing the memory system to remove invalid data based at least in part on the size of the available resources being less than the size of the set of data;
receive, in response to the one or more commands, a second indication of the size of the available resources; and
transmit, to the memory system, the set of data based at least in part on the size of the available resources indicated in the second indication of the size of the available resources being greater than or equal to the size of the set of data.

18. An apparatus, comprising:
at least one memory device; and
at least one controller coupled with the at least one memory device and configured to cause the apparatus to:
delay first garbage collection operations for a first set of resources at a memory system while second garbage collection operations are enabled for a second set of resources at the memory system;
receive a request for an indication of whether the memory system comprises available resources for storing a set of data;
transmit, in response to the request, the indication of whether the memory system comprises the available resources for storing the set of data based at least in part on a comparison of a size of the first set of resources with a threshold size;
receive the set of data based at least in part on the size of the first set of resources being smaller than the threshold size;
receive, based at least in part on the size of the first set of resources being less than the threshold size, an indication of a beginning of a write operation for the set of data;
receive the set of data based at least in part on receiving the indication of the beginning of the write operation; and
write, based at least in part on receiving the set of data, the set of data to the first set of resources.

19. The apparatus of claim 18, wherein the at least one controller is further configured to cause the apparatus to:
delay the second garbage collection operations for the second set of resources;
receive a second request for a second indication of whether the memory system comprises available resources for storing a second set of data; and
transmit, in response to the second request, the second indication of whether the memory system comprises available resources for storing the second set of data based at least in part on a second comparison of the threshold size with a combined size of the first set of resources and the second set of resources.

20. The apparatus of claim 19, wherein the at least one controller is further configured to cause the apparatus to:
receive, based at least in part on the combined size being greater than the threshold size, a command to enable third garbage collection operations for the first set of resources and the second set of resources; and
perform one or more garbage collection operations for the first set of resources and the second set of resources based at least in part on the command to enable the third garbage collection operations.

21. The apparatus of claim 18, wherein the at least one controller is further configured to cause the apparatus to:
transmit, based at least in part on writing the set of data to the first set of resources, an indication that the set of data was written successfully to the first set of resources;
receive, based at least in part on the set of data being written successfully, an indication of an end of the write operation; and
perform, based at least in part on indicating the end of the write operation, a set of garbage collection operations that were delayed for the first set of resources.

22. The apparatus of claim 18, wherein the at least one controller is further configured to cause the apparatus to:
store, based at least in part on receiving the indication of the beginning of the write operation, one or both of a first mapping comprising first associations between logical addresses and physical addresses at the memory system or a second mapping indicating a validity of data stored at physical addresses at the memory system.

23. The apparatus of claim 22, wherein the at least one controller is further configured to cause the apparatus to:
    transmit, based at least in part on writing the set of data to the first set of resources, an indication of a failure of the write operation for the set of data; and
    replace, based at least in part on the failure of the write operation, a third mapping comprising third associations between logical addresses and physical addresses at the memory system with the first mapping and a fourth mapping indicating the validity of data stored at physical addresses at the memory system with the second mapping.

24. The apparatus of claim 23, wherein the at least one controller is further configured to cause the apparatus to:
    transmit an indication that the third mapping and fourth mapping have been successfully replaced by the first mapping and the second mapping.

25. The apparatus of claim 18, wherein the threshold size is based at least in part on a size of the available resources at the memory system.

26. An apparatus, comprising:
    at least one controller configured to cause the apparatus to:
        identify a first set of resources at a memory system for which first garbage collection operations are delayed while second garbage collection operations are enabled for a second set of resources of the memory system based at least in part on a set of data to be written at the memory system;
        transmit a request for an indication of whether the memory system comprises available resources for storing the set of data;
        receive, in response to the request, the indication of whether the memory system comprises the available resources for storing the set of data;
        transmit the set of data based at least in part on the memory system comprising the available resources for storing the set of data;
        transmit a command to delay the second garbage collection operations for the second set of resources based at least in part on a second set of data to be written at the memory system;
        transmit a second request for a second indication of whether the memory system comprises available resources for storing the second set of data; and
        receive, in response to the second request, the second indication of whether the memory system comprises available resources, the second indication being based at least in part on a threshold size and a combined size of the first set of resources and the second set of resources.

27. The apparatus of claim 26, wherein the at least one controller is further configured to cause the apparatus to:
    transmit, based at least in part on the combined size being greater than the threshold size, a second command to enable third garbage collection operations for the first set of resources and the second set of resources.

28. A method, comprising:
    receiving an indication that a set of data is to be written at a memory system;
    removing, based at least in part on the indication that the set of data is to be written, invalid data at the memory system until a size of available resources at the memory system is greater than or equal to a size of the set of data;
    delaying garbage collection operations at the memory system based at least in part on the size of the available resources being greater than or equal to the size of the set of data after removing the invalid data;
    transmitting, based at least in part on removing the invalid data, an indication that the size of the available resources is greater than or equal to the size of the set of data;
    receiving, based at least in part on the indicated size of the available resources being greater than or equal to the size of the set of data, an indication of a beginning of a write operation for the set of data;
    receiving the set of data based at least in part on receiving the indication of the beginning of the write operation; and
    writing, based at least in part on receiving the set of data, the set of data to the available resources based at least in part on delaying the garbage collection operations.

29. The method of claim 28, further comprising:
    transmitting, in response to receiving the indication that data is to be written, an indication of the size of the available resources at a time prior to the invalid data being removed.

30. The method of claim 29, further comprising:
    receiving, based at least in part on the indicated size of the available resources being less than the size of the set of data, a command to remove the invalid data;
    performing a garbage collection operation based at least in part on the command, wherein a portion of the invalid data is removed based at least in part on performing the garbage collection operation; and
    transmitting, based at least in part on a completion of the garbage collection operation and prior to delaying the garbage collection operations, a second indication of the size of the available resources.

* * * * *